United States Patent
Simoyama

(10) Patent No.: US 11,307,480 B2
(45) Date of Patent: Apr. 19, 2022

(54) OPTICAL SEMICONDUCTOR DEVICE

(71) Applicants: FUJITSU LIMITED, Kawasaki (JP); Photonics Electronics Technology Research Association, Tokyo (JP)

(72) Inventor: Takasi Simoyama, Zama (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 0 days.

(21) Appl. No.: 16/851,440

(22) Filed: Apr. 17, 2020

(65) Prior Publication Data
US 2020/0363695 A1 Nov. 19, 2020

(30) Foreign Application Priority Data
May 17, 2019 (JP) .............................. JP2019-093396

(51) Int. Cl.
*G02F 1/225* (2006.01)
*G02B 6/14* (2006.01)
*G02B 6/12* (2006.01)

(52) U.S. Cl.
CPC ............. *G02F 1/2257* (2013.01); *G02B 6/14* (2013.01); *G02B 2006/12152* (2013.01)

(58) Field of Classification Search
CPC ............ G02B 6/14; G02B 2006/12152; G02F 1/2257
See application file for complete search history.

(56) References Cited

U.S. PATENT DOCUMENTS

| | | | |
|---|---|---|---|
| 6,498,885 B1 * | 12/2002 | Nakamura | B82Y 20/00 385/122 |
| 7,187,813 B2 * | 3/2007 | Jones | G02F 1/025 385/2 |
| 2007/0110453 A1 | 5/2007 | Akiyama et al. | |
| 2015/0372159 A1 * | 12/2015 | Englund | G01J 3/18 356/328 |

FOREIGN PATENT DOCUMENTS

| | | | | |
|---|---|---|---|---|
| JP | 2005182030 A | * | 7/2005 | ............. G02B 6/136 |
| JP | 2007-139888 | | 6/2007 | |
| JP | 2009-200091 | | 9/2009 | |
| JP | 2009117708 A | * | 9/2009 | ............. H01L 31/10 |
| JP | 2013-228466 | | 11/2013 | |

* cited by examiner

*Primary Examiner* — Daniel Petkovsek
(74) *Attorney, Agent, or Firm* — Staas & Halsey LLP

(57) ABSTRACT

An optical semiconductor device including an optical waveguide; a light absorbing region coupled to the optical waveguide; a first conductive region and a second conductive region disposed at both sides of the light absorbing region so as to sandwich the light absorbing region; and a conductor coupled to the first conductive region and the second conductive region to let the first conductive region and the second conductive region short-circuit. With this configuration, the optical semiconductor device provides effects that absorption saturation is less likely to occur even if the light intensity increases, so that reflection return light can be reliably suppressed without using an external power source.

15 Claims, 34 Drawing Sheets

GUIDED LIGHT    REFLECTED LIGHT

GUIDED LIGHT    REFLECTED LIGHT

GUIDED LIGHT   LIGHT ABSORBING REGION

GUIDED LIGHT   LIGHT ABSORBING REGION

OPTICAL SEMICONDUCTOR DEVICE

CROSS-REFERENCE TO RELATED APPLICATION

This application is based upon and claims the benefit of priority of the prior Japanese Patent application No. 2019-093396, filed on May 17, 2019, the entire contents of which are incorporated herein by reference.

FIELD

The present invention relates to an optical semiconductor device.

BACKGROUND

For example, an optical terminator may be provided in an optical semiconductor device used in an optical integrated circuit or the like.

One of the conventional optical terminators has a structure in which the end of the waveguide is inclined with respect to the optical axis to prevent the reflected return light from being recombined with the waveguide (see, for example, FIGS. 69 and 70).

In addition, another structure provides a light absorbing region at the end of the waveguide, and prevents reflection by means of light absorption (see, for example, FIGS. 71 and 72).

Furthermore, there is a structure in which a light receiver including a light absorbing region is used as an optical terminator (for example, see FIGS. 73 and 74).

[Patent Literature 1] Japanese Laid-open Patent Publication No. 2009-200091

[Patent Literature 2] Japanese Laid-open Patent Publication No. 2013-228466

[Patent Literature 3] Japanese Laid-open Patent Publication No. 2007-139888

However, a structure using the oblique end face as illustrated in FIG. 69 and FIG. 70, for example, fails in completely preventing the reflected return light, and therefore has extremely poor performance as an optical terminator.

Further, for example, in a structure using a light absorbing region as illustrated in FIGS. 71 and 72, the electron-hole pairs generated by light absorption remain locally without drift caused an electric field or the like, so that absorption saturation occurs relatively easily.

Therefore, when the light intensity is increased, the light is not sufficiently absorbed and the resultant remaining light is reflected, thereby impairing the characteristics of an optical terminator.

In this case, a PIN diode structure may be used as a means for increasing the light intensity at which saturation occurs.

However, also in this case, since the photovoltaic effect generates a potential difference between the P-type semiconductor region and the N-type semiconductor region and lowers the electric field intensity of the depletion layer, it is inevitable that absorption saturation is also generated with an increase in light intensity.

Further, in order to separate electron-hole pairs generated by light-absorption resulting from applying an electric field from the outside, it is also conceivable to adopt a configuration in which, for example, a light receiver as illustrated in FIGS. 73 and 74 is used as an optical terminator.

However, requiring an external power source, this case is not preferable for a cost of installing the external power source and a cost of supplying power from the external power source is required, for example.

SUMMARY

According to an aspect of the embodiments, an optical semiconductor device includes: an optical waveguide; a light absorbing region coupled to the optical waveguide; a first conductive region and a second conductive region disposed at both sides of the light absorbing region so as to sandwich the light absorbing region; and a conductor coupled to the first conductive region and the second conductive region to let the first conductive region and the second conductive region short-circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
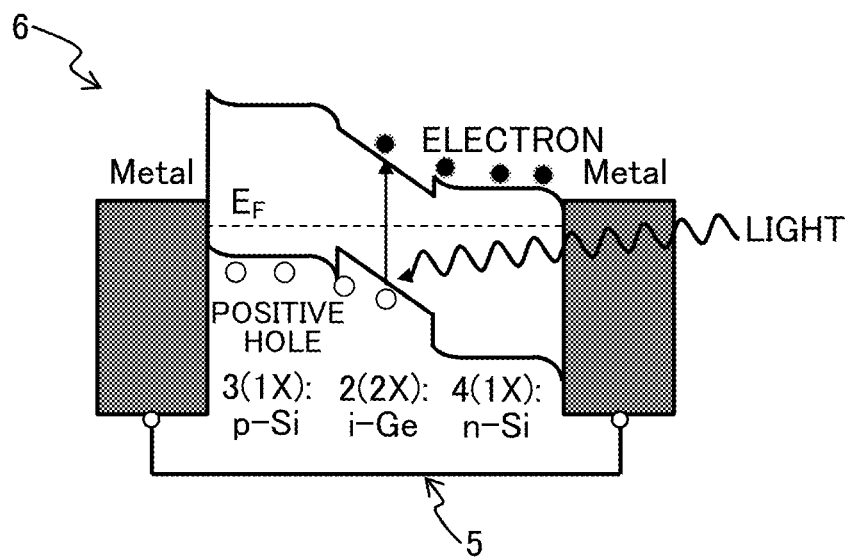
FIG. 1 is an energy band diagram illustrating an optical semiconductor device according to the present embodiment.

Hereinafter, an optical semiconductor device according to an embodiment of the present invention will be described with reference to FIGS. 1 to 75.

The optical semiconductor device according to the present embodiment is used, for example, in an optical terminator (terminator) used in an integrated optical circuit.

As illustrated in FIGS. 3 to 12, 14 to 17, and 19 to 24, the optical semiconductor device includes: an optical waveguide 1; a light absorbing region 2 connected to the optical waveguide 1; a first conductive region 3 and a second conductive region 4 provided on the both sides of the light absorbing region 2 so as to sandwich the light absorbing region 2; and a conductor 5 connected to the first conductive region 3 and the second conductive region 4 to let a first conductive region 3 and the second conductive region 4 short-circuit. The conductive region is also referred to as a conductive-type region.

Here, at least a part of the conductor 5 coupled to the first conductive region 3 and a part of the conductor 5 coupled to the second conductive region 4 have the same potential, and an electric field is applied to the light absorbing region 2.

This means that the conductor 5 is ohmically bonded to each of the first conductive region 3 and the second conductive region 4, the part of the conductor 5 coupled to the first conductive region 3 and the part of the conductor 5 coupled to the second conductive region 4 have the same potential (i.e. the first conductive region 3 and the second conductive region 4 are at the same potential), and an electric field is applied to the light absorbing region 2.

The light absorbing region 2, the first conductive region 3, the second conductive region 4, and the conductor 5 preferably constitute an optical terminator 6.

Here, the conductor 5 is preferably an integrated conductor extending from the first conductive region 3 to the second conductive region 4.

Alternatively, multiple conductors 5 may be provided. For example, the conductor 5 may be formed of a first conductor connected to the first conductive region 3, a second conductor connected to the second conductive region 4, and a third conductor connecting the first conductor to the second conductor. In other words, the conductor 5 may be formed of multiple conductors directly bound to one other.

Further alternatively, multiple integrated conductors each extending from the first conductive region 3 to the second conductive region 4 may be provided at multiple points.

It is satisfactory that the conductor 5 is connected to the first conductive region 3 and the second conductive region 4. The conductor 5 needs to be in contact with the regions 3 and 4 at least at two points, but the conductor 5 may be in contact with three or more points (see, for example, FIGS. 7, 8, 21, and 22).

The conductor 5 is preferably made of a metal (for example, a metal film).

In the present embodiment, the first conductive region 3 is a p-type semiconductor region doped with a p-type impurity; the light absorbing region 2 is a non-conductive intrinsic semiconductor region; the second conductive region 4 is an n-type semiconductor region doped with an n-type impurity; and therefore the regions 2-4 collectively has a PIN-diode configuration.

In the present embodiment, the optical waveguide 1 is formed of a first semiconductor layer 1X (e.g., Si layer) having a band gap larger than the photon energy of the light to be used, and the light absorbing region 2 is formed of a second semiconductor layer 2X (e.g., Ge layer) having a band gap smaller than the photon energy of the light to be used.

In the present embodiment, as illustrated in FIGS. 3 to 12, the light absorbing region 2 is formed of an intrinsic semiconductor region (e.g., i-Ge) 2A of the second semiconductor layer 2X; the first conductive region 3 is formed of a p-type semiconductor region (e.g., p-Si) 3A doped with a p-type impurity of the first semiconductor layer 1X; and the second conductive region 4 is formed of an n-type semiconductor region (e.g., n-Si) 4A doped with an n-type impurity of the first semiconductor layer 1X. This structure is referred to as a first structure.

Here, this structure is provided adjacent to an Si substrate (semiconductor substrate) 7, and is covered with a SiO$_2$ layer (insulating layer) 8.

Figure 13:
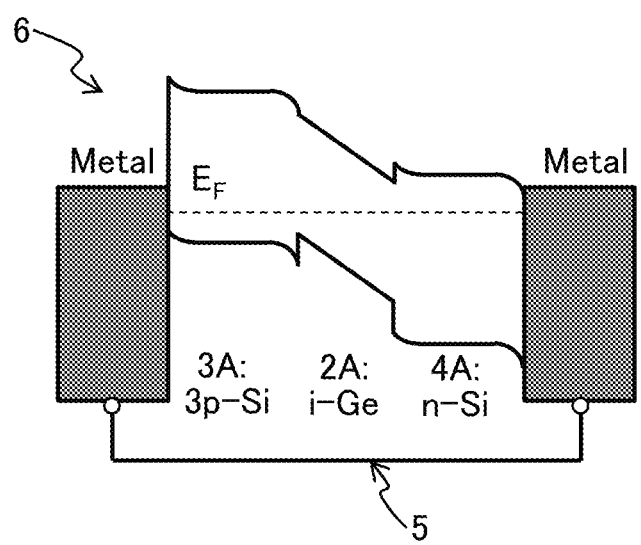
FIG. 13 is an energy band diagram in one example and other examples of a first structure (in cases where the conductive regions having the both polarities are provided in a first semiconductor layer) of the optical semiconductor device according to the present embodiment on paths along the X-X' line in FIGS. 3, 5, 7, 9, and 11.

In this instance, the depletion layer region of the second semiconducting layer 2X is electrically sandwiched between the p- and n-polar regions, so that the electron-hole pairs generated in the depletion layer can be separated and have respective paths through which the electrons and holes can propagate to the respective polar regions. The energy band diagram along such paths is as illustrated in FIG. 13.

Here, an intrinsic semiconductor region 2A of the second semiconductor layer 2X is a region of at least a part of the second semiconductor layer 2X and has a low impurity density.

The first semiconductor layer 1X is provided with conductive regions 3A, 4A (first conductive region 3 and second conductive region 4) having different positive and negative polarities, and a non-conductive region (non-conductive intrinsic semiconductor region 2A) electrically sandwiched between these conductive regions 3A, 4A (connected in series between both polar regions) is provided in the second semiconductor layer 2X. Thereby, a PIN diode structure (layer structure of a pin-type diode) is formed.

Here, the conductive regions 3A, 4A having different polarities are provided only in the first semiconductor layer 1X, and the entire second semiconductor layer 2X is the non-polar region (non-conductive region) 2A.

By employing the above-described configuration and short-circuiting P- and N-bipolar regions 3A, 4A (3, 4) of the PIN structure with the conductors 5, it is possible to prevent generation of a potential difference between the P- and N-bipolar regions as illustrated in FIG. 1.

That is, by adopting the above-described configuration, the electron-hole pairs generated in the depletion layer serving as the light absorbing region 2 are carried to the short-circuited conductor 5, and are annihilated in the conductor 5.

As a result, lowering of the electric field intensity due to the photovoltaic effect is inhibited, and even if the light intensity increases, the electron-hole pairs continue to be spatially separated. As a result, an empty level at which band-to-band transitions can occur is continuously supplied, so that a decrease in the absorption coefficient is less likely to occur, and the characteristics of the optical terminator 6 are maintained even in a state where the light intensity is high.

In addition, since an electric field can be applied to the light absorbing region 2 under a state where electric power is not supplied from the outside, the photocarriers generated in the light absorbing region 2 are quickly transported to the bipolar regions 3A, 4A (3, 4) by drift, and local accumulation of carriers is not generated. Therefore, absorption saturation hardly occurs, and reflection return light can be almost completely suppressed.

As described above, since the first conductive region 3 and the second conductive region 4 are short-circuited so that the conductor 5 has the same potential, an electric field can be applied to the intrinsic semiconductor region 2A of the second semiconductor layer 2X serving as the light absorbing region 2 without providing a mechanism for controlling a potential difference of the conductors 5 (between the first conductive region 3 and the second conductive region 4) from the outside. Thereby, light incident from the first semiconductor layer 1X can be guided to the second semiconductor layer 2X, and the elements 2-5 can be collectively used as the optical terminator 6.

The first conductive region 3 and the second conductive region 4 may be provided to the both sides in the horizontal direction of the light absorbing region 2 interposed therebetween, as illustrated in, for example, FIGS. 3, 4, 9 to 12, or may be provided to the both sides in the vertical direction with the light absorbing region 2 interposed therebetween, as illustrated in, for example, FIGS. 5 to 8.

Figure 9:
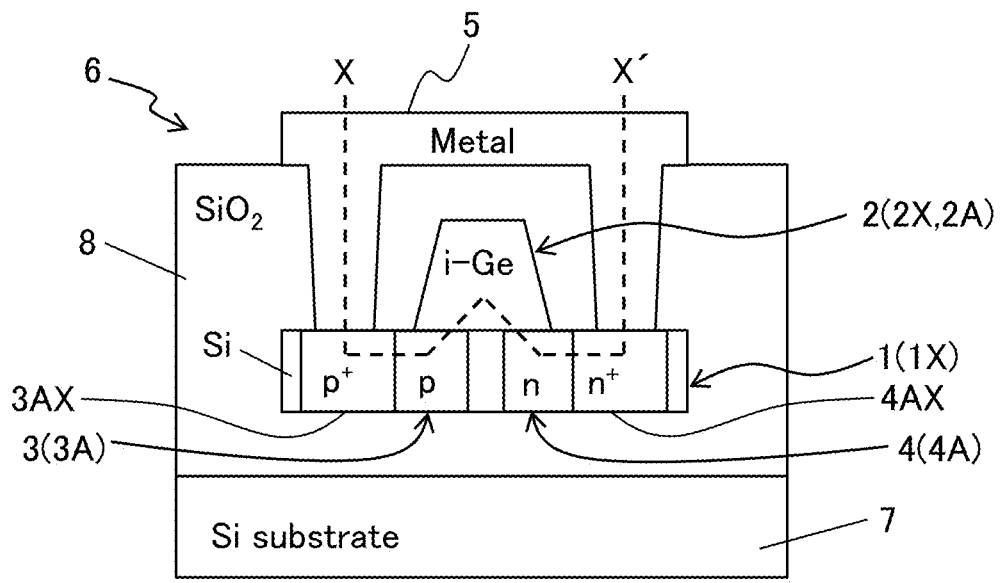
FIG. 9 is a cross-sectional view illustrating another example of the configuration of a first structure (in cases where the conductive regions having the both polarities are provided in a first semiconductor layer) of the optical semiconductor device according to the present embodiment.
Figure 10:
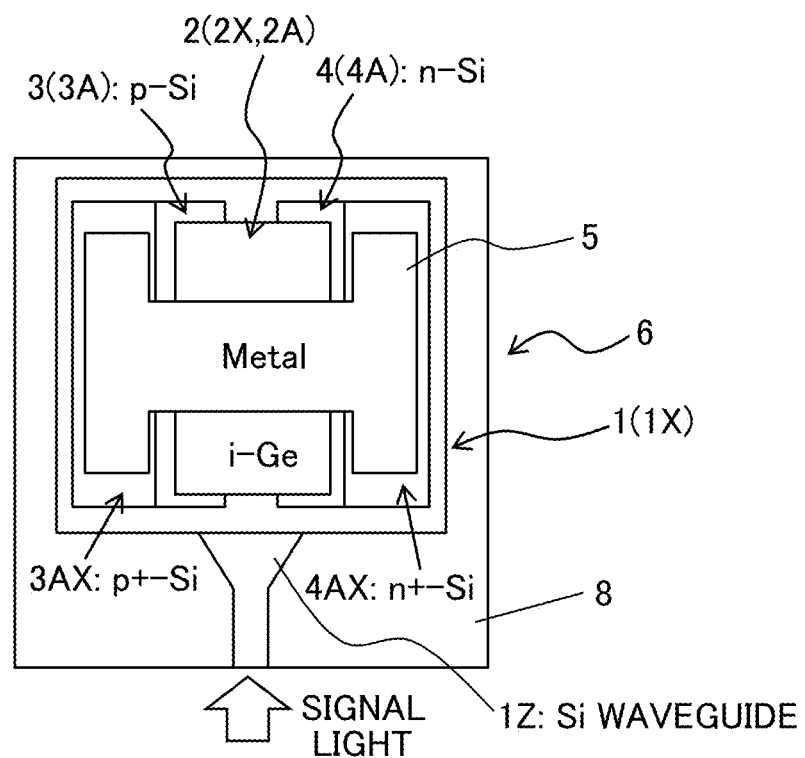
FIG. 10 is a plan view (a top view) illustrating another example of the configuration of a first structure (in cases where the conductive regions having the both polarities are provided in a first semiconductor layer) of the optical semiconductor device according to the present embodiment.

Further, as illustrated in FIGS. 9 and 10, for example, it is preferable that the p-type semiconductor region 3A includes high impurity density region 3AX having an impurity density higher than that of the remaining region in the region connected to the conductor 5, and the n-type semiconductor region 4 includes high impurity density region 4AX having an impurity density higher than that of the remaining region in the region connected to the conductor 5.

In this preferable case, the conductor 5 is coupled to these high impurity density regions 3AX, 4AX. For example, it is preferable to provide the conductors 5 (e.g., metal film) on the high impurity density regions 3AX, 4AX so that the high impurity density regions 3AX, 4AX can be connected to each other.

As described above, the conductive regions 3A, 4A having the respective polarities may each be formed of regions having multiple different impurity densities, and it is preferable that the conductive regions 3A, 4A are formed to have high impurity density particularly at the interface with the conductor 5 and consequently have low resistance (contact resistance) at the ohmic junction of the interface with the conductor 5.

Further, for example, as illustrated in FIGS. 3 to 10, the second semiconductor layer 2X may be provided to the first semiconductor layer 1X. Alternatively, as illustrated in FIGS. 11 and 12, the first semiconductor layer 1X may include a recess 1Y, and the second semiconductor layer 2X may be provided in the recess 1Y.

In cases where the first semiconductor layer 1X includes the recess 1Y and the second semiconductor layer 2X is provided in the recess 1Y, the thickness of the first semiconductor layer 1X (optical waveguide 1) in the region where the second semiconductor layer 2X is provided is smaller than the thickness of the first semiconductor layer 1X in the remaining region.

Figure 11:
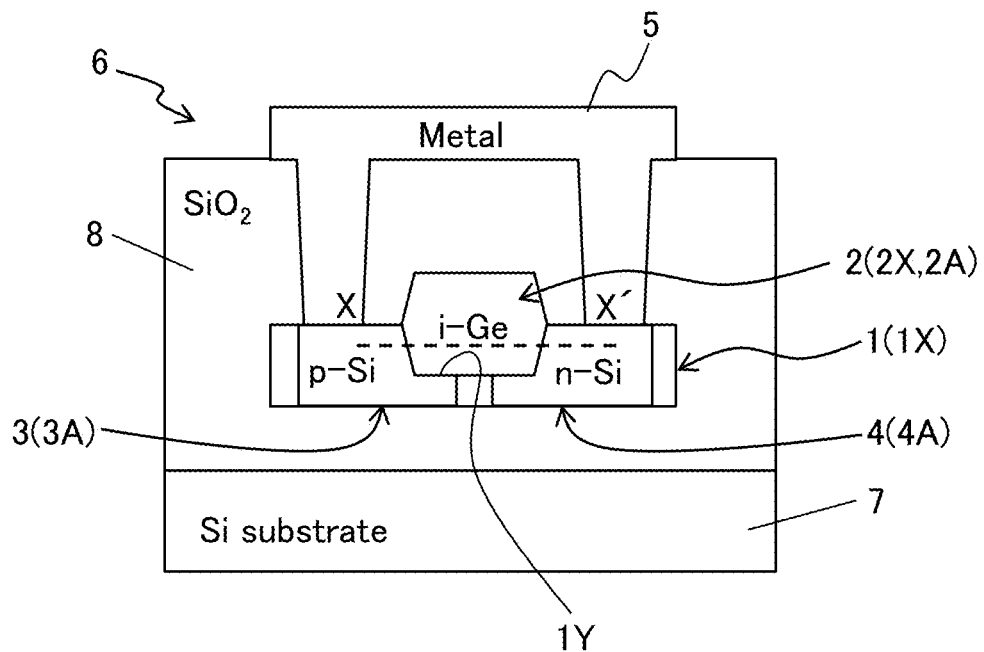
FIG. 11 is a cross-sectional view illustrating another example of the configuration of a first structure (in cases where the conductive regions having the both polarities are provided in a first semiconductor layer) of the optical semiconductor device according to the present embodiment.
Figure 12:
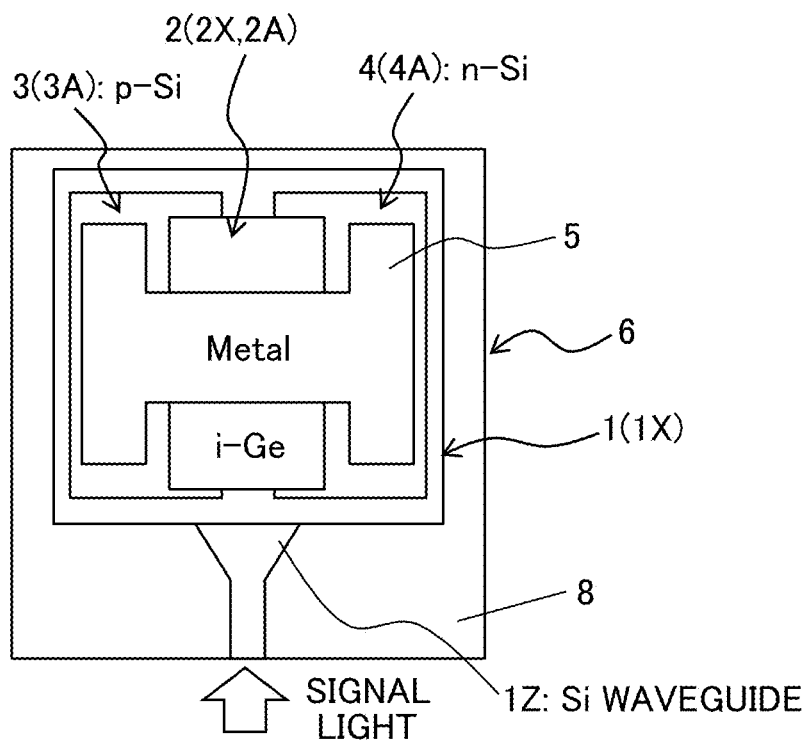
FIG. 12 is a plan view (a top view) illustrating another example of the configuration of a first structure (in cases where the conductive regions having the both polarities are provided in a first semiconductor layer) of the optical semiconductor device according to the present embodiment.

As described above, as the physical positional relationship between the first semiconductor layer 1X and the second semiconductor layer 2X, the second semiconductor layer 2X may be provided in a form of being loaded on the first semiconductor layer 1X acting as the optical waveguide 1 and the light may propagate by evanescent coupling (see, for example, FIGS. 3 to 10), or the recess (depression) 1Y may be formed on a part of the first semiconductor layer 1X, and the second semiconductor layer 2X may be provided in the recess 1Y, so that the light enters by butt coupling (see, for example, FIGS. 11 and 12).

Incidentally, the layer structure of the semiconductor, the junction structure of the conductor, and the like are not limited to the above-mentioned structures, and alternatively, as illustrated in FIGS. 14 to 17, the light absorbing region 2 may be formed of an intrinsic semiconductor region (e.g., i-Ge) 2A of the second semiconductor layer 2X, the first conductive region 3 may be formed of a p-type semiconductor region (e.g., p-Ge) 2B doped with a p-type impurity of the second semiconductor layer 2X, and the second conductive region 4 may be formed of an n-type semiconductor region (e.g., n-Ge) 2C doped with an n-type impurity of the second semiconductor layer 2X. This alternative structure is referred to as a second structure.

Figure 18:
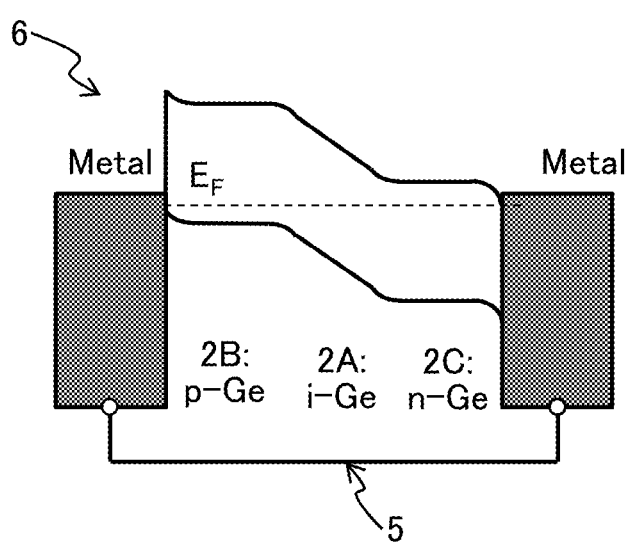
FIG. 18 is an energy band diagram in one example and other examples of a second structure (in cases where the conductive regions having the both polarities are provided in a second semiconductor layer) of the optical semiconductor device according to the present embodiment on paths along the X-X' line in FIGS. 14 and 16.

Also in this case, the depletion layer region of the second semiconductor layer 2X is electrically sandwiched between the p- and n-polar regions, so that the electron-hole pairs generated in the depletion layer are separated and have respective paths through which the electrons and holes can propagate to the respective polar regions. The energy band diagram along such paths is as illustrated in FIG. 18.

In addition, the second semiconductor layer 2X is provided with conductive regions 2B, 2C (first conductive region 3 and second conductive region 4) having different positive and negative polarities, and a non-conductive region (non-conductive intrinsic semiconductor region 2A) electrically sandwiched between these conductive regions 2B, 2C (connected in series between both polar regions) is provided in the second semiconductor layer 2X. Thereby, a PIN diode structure (layer structure of a pin-type diode) is formed.

Here, the conductive regions 2B, 2C having different polarities and the nonpolar region (non-conductive region) 2A are all provided to the second semiconductor layer 2X.

The first conductive region 3 and the second conductive region 4 are provided to the both horizontal sides of the light absorbing region 2 so as to sandwich the light absorbing region 2, for example, as illustrated in FIGS. 14 to 17.

Also in this case, the conductor 5 is ohmically bonded to the first conductive region 3 and the second conductive region 4 and consequently, the part of the conductor 5 coupled to the first conductive region 3 and the part of the conductor 5 coupled to the second conductive region 4 have the same potential (the first conductive region 3 and the second conductive region 4 have the same potential) and an electric field is applied to the light absorbing region 2. Then, the same action and effect as those of the first structure can be obtained.

Figure 16:
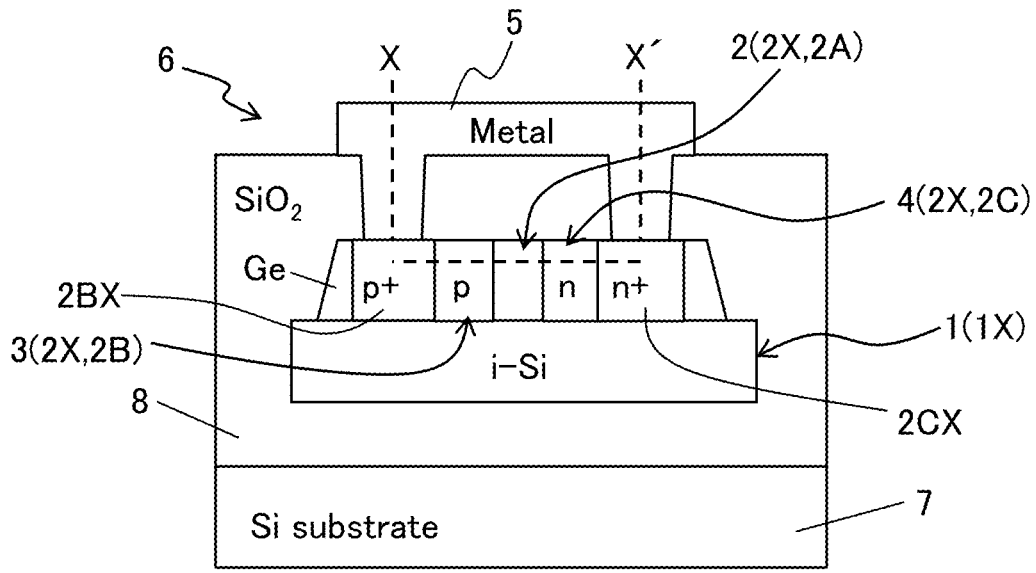
FIG. 16 is a cross-sectional view illustrating another example of the configuration of a second structure (in cases where the conductive regions having the both polarities are provided in a second semiconductor layer) of the optical semiconductor device according to the present embodiment.
Figure 17:
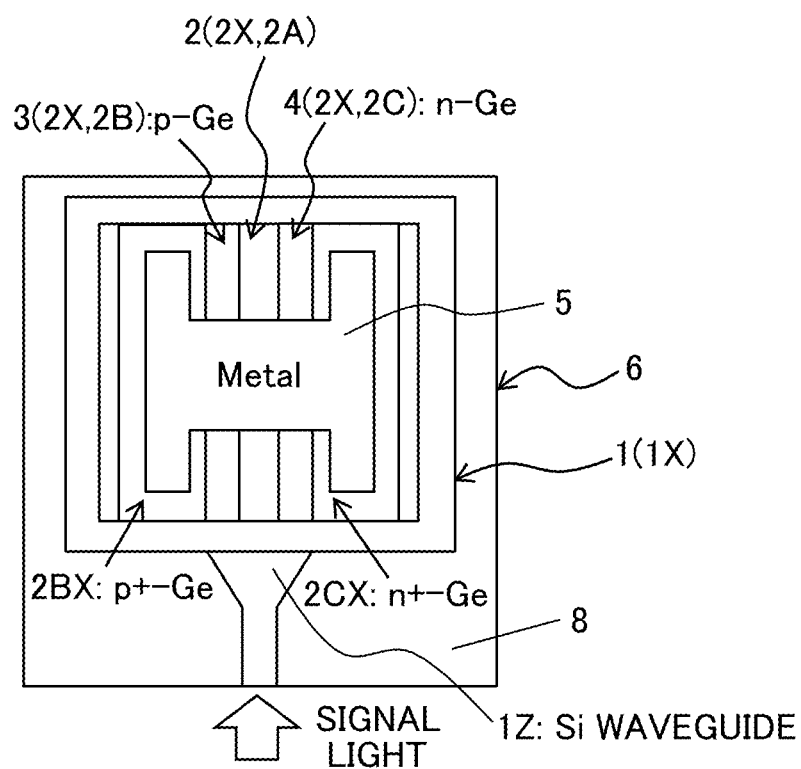
FIG. 17 is a plan view (a top view) illustrating another example of the configuration of a second structure (in cases where the conductive regions having the both polarities are provided in a second semiconductor layer) of the optical semiconductor device according to the present embodiment.

As illustrated in FIGS. 16 and 17, for example, it is preferable that the p-type semiconductor region 2B includes a high impurity density region 2BX having an impurity density higher than that of the remaining region in the region coupled to the conductor 5, and the n-type semiconductor region 2C includes high impurity density region 2CX having an impurity density higher than that of the remaining region in the region coupled to the conductor 5.

In this preferable case, the conductor 5 is coupled to these high impurity density regions 2BX, 2CX. For example, it is preferable to provide the conductors 5 (e.g., metal film) on the high impurity density regions 2BX, 2CX so that the high impurity density regions 2BX, 2CX can be connected to each other.

As described above, the conductive regions 2B, 2C having the respective polarities may each be formed of regions having multiple different impurity densities, and it is preferable that the conductive regions 2B, 2C are formed to have high impurity density particularly at the interface with the conductor 5 and consequently have low resistance (contact resistance) at the ohmic junction of the interface with the conductor 5.

In this case, as illustrated in FIGS. 14 to 17, the second semiconductor layer 2X is provided to the first semiconductor layer 1X, and the second semiconductor layer 2X is provided in a form of being loaded on the first semiconductor layer 1X acting as optical waveguide 1, and the light is propagated by evanescent coupling, but a configuration in which a recess is formed on the first semiconductor layer so that the light is inputted into the second semiconductor layer by butt coupling may be adopted.

Incidentally, as illustrated in FIGS. 19 to 24, for example, the light absorbing region 2 may be formed of an intrinsic semiconductor region (e.g., i-Ge) 2A of the second semiconductor layer 2X, the first conductive region 3 may be formed of a p-type semiconductor region (e.g., p-Si) 3A doped with a p-type impurity of the first semiconductor layer 1X, and the second conductive region 4 may be formed of an n-type semiconductor region (e.g., n-Ge) 2C doped with an n-type impurity of the second semiconductor layer 2X. This structure is referred to as a third structure.

Figure 25:
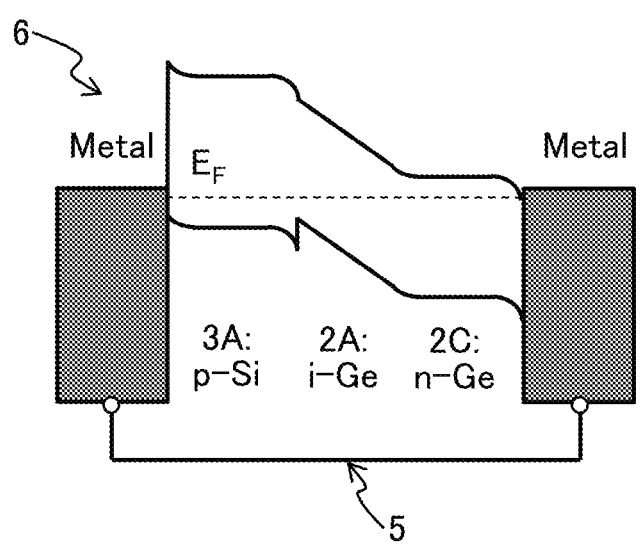
FIG. 25 is an energy band diagram in one example and other examples of a third structure (in cases where the conductive regions having different polarities are provided one in each of a first semiconductor layer and a second semiconductor layer) of the optical semiconductor device according to the present embodiment on paths along the X-X' line in FIGS. 19, 21, and 23.

Also in this case, the depletion layer region of the second semiconductor layer 2X is electrically sandwiched between the p- and n-polar regions, so that the electron-hole pairs generated in the depletion layer are separated and have respective paths through which the electrons and holes can propagate to the respective polar regions. The energy band diagram along such paths is as illustrated in FIG. 25.

The first semiconductor layer 1X and the second semiconductor layer 2X provided with conductive regions 3A, 2C (first conductive region 3 and second conductive region 4) having different positive and negative polarities, and a non-conductive region (non-conductive intrinsic semiconductor region 2A) electrically sandwiched between these conductive regions 3A, 2C (connected in series between both polar regions) is provided in the second semiconductor layer 2X. Thereby, a PIN diode structure (layer structure of a pin-type diode) is formed.

Here, the conductive regions 3A, 2C having different polarities are provided in the first semiconductor layer 1X and the second semiconductor layer 2X, respectively, and the nonpolar region (non-conductive region) 2A is provided in the second semiconductor layer 2X.

The first conductive region 3 and the second conductive region 4 may be provided to the both vertical sides of the light absorbing region 2 so as to sandwich the light absorbing region 2, as illustrated in FIGS. 19 to 24, for example.

Also in this case, the conductor 5 is ohmically bonded to the first conductive region 3 and the second conductive region 4 and consequently the part of the conductor 5 coupled to the first conductive region 3 and the part of the conductor 5 coupled to the second conductive region 4 have the same potential (i.e., the first conductive region 3 and the second conductive region 4 have the same potential) and an electric field is applied to the light absorbing region 2. Then, the same action and effect as those of the first structure can be obtained.

It is satisfactory that the conductor 5 is connected to the first conductive region 3 and the second conductive region 4. The conductor 5 needs to be in contact with the regions at least at two points, but the conductor 5 may be in contact with three or more points (see, for example, FIG. 21).

Figure 23:
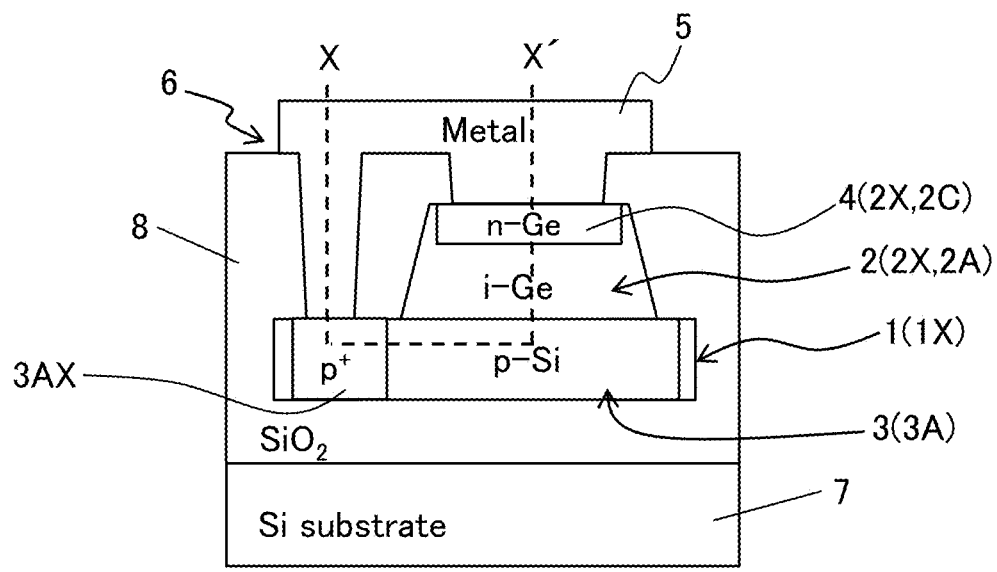
FIG. 23 is a cross-sectional view illustrating another example of a configuration of a third structure (in cases where the conductive regions having different polarities are provided one in each of a first semiconductor layer and a second semiconductor layer) of the optical semiconductor device according to the present embodiment.
Figure 24:
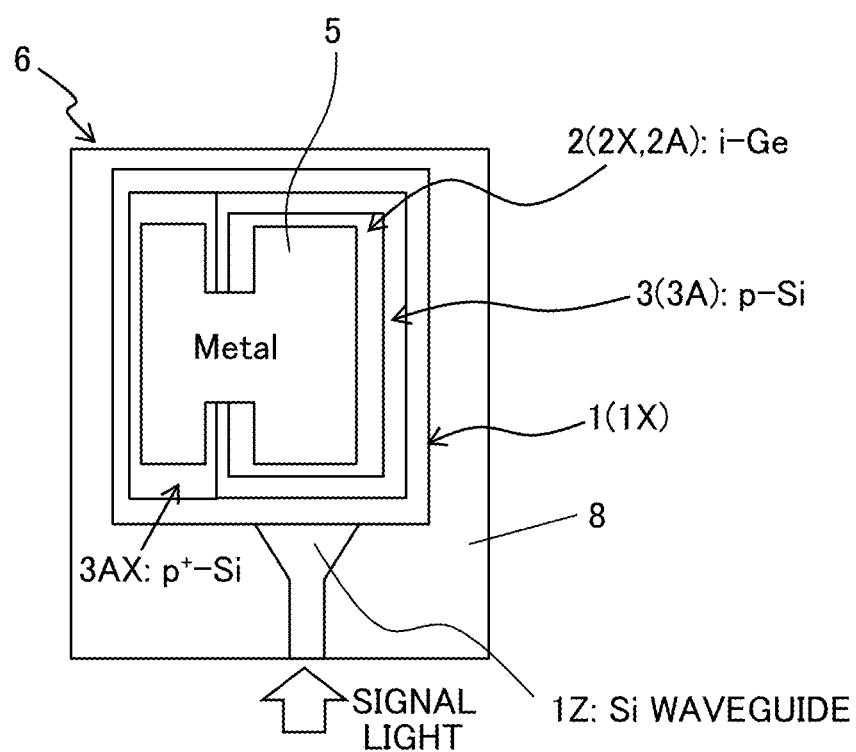
FIG. 24 is a plan view (a top view) illustrating another example of a configuration of a third structure (in cases where the conductive regions having different polarities are provided one in each of a first semiconductor layer and a second semiconductor layer) of the optical semiconductor device according to the present embodiment.

For example, as illustrated in FIG. 23 and FIG. 24, it is preferable that the p-type semiconductor region 3A includes high impurity density region 3AX having an impurity density higher than that of the remaining region in the region connected to the conductor 5.

In this preferable case, the conductor 5 is coupled to this high impurity density region 3AX. For example, it is preferable to provide the conductors 5 (e.g., metal film) on the high impurity density region 3AX so that the high impurity density region 3AX can be connected to the conductor 5.

As described above, the conductive region 3A having the respective polarities may be formed of regions having multiple different impurity densities, and it is preferable that the conductive region 3A are formed to have high impurity density particularly at the interface with the conductor 5 and consequently have low resistance (contact resistance) at the ohmic junction of the interface with the conductor 5.

Here, for example, as illustrated in FIGS. 19 to 24, the second semiconductor layer 2X is provided to the first semiconductor layer 1X, and the second semiconductor layer 2X is provided in a form of being loaded on the first semiconductor layer 1X acting as the optical waveguide 1, and the light is propagated by evanescent coupling, but a configuration in which a recess is formed on the first semiconductor layer so that the light is inputted into the second semiconductor layer by butt coupling may be adopted.

Here, in the above-mentioned embodiments (specifically, the first structure, the second structure, and the third structure; for example, see FIGS. 3 to 25), the materials of the first semiconductor layer 1X and the second semiconductor layer 2X are exemplified by Si and Ge which are materials commonly used in the field of Si-photonics, respectively, but are not limited to those. Alternatively, a material being relatively transparent to desired light and suitable for use as optical waveguide 1 and a material having a small band gap and being capable of absorbing desired light by band-to-band transition may be used for the first semiconductor layer 1X and the second semiconductor layer 2X, respectively.

Alternatively, the first semiconductor layer 1X may be made of Si, and the second semiconductor layer 2X may be made of $Si(x)Ge(1-x)$ ($0 \leq x < 1$).

Further alternatively, the first semiconductor layer 1X may be made of Si, and the second semiconductor layer 2X may be made of $Ge(1-x)Sn(x)$ ($0 \leq x < 1$).

In the above-described embodiments (specifically, the first structure, the second structure, and the third structure; for example, see FIGS. 3 to 25), the optical waveguide 1 includes a tapered structure 1Z in which the waveguide width changes at a light-incident region to the light absorbing region 2. Here, the optical waveguide 1 composed of the first semiconductor layer 1X has a tapered structure 1Z whose waveguide width changes in the vicinity of the mesa composed of the second semiconductor layer 2X.

Incidentally, the reason for adopting the configuration of the above-mentioned embodiment (specifically, the first structure, the second structure, and the third structure; for example, see FIGS. 3 to 25) is as follows.

In order to achieve a small-sized, low-power, large-capacity optical transmitter/receiver, researches and developments have been actively conducted in a field called Si-Photonics, in which optical components are formed on an Si substrate having high compatibility with electronic circuits.

A significant advantage of Si-Photonics is that large-scale integrated optical circuits composed of a large number of elemental devices can be easily manufactured by utilizing a high-definition processing technique used in CMOS manufacturing.

In such an optical integrated circuit, for example, in an optical circuit for a transceiver for a data center, light input/output mechanisms from and to the outside, such as a light emitting device (laser), an optical modulator using interferences between branched optical paths, and a light receiver that branches a part of light from an optical waveguide to monitor the light intensity for the purpose of controlling the light intensity, are integrated, and these components are connected by a large number of optical branches.

Part of the branched optical paths may need to be terminated without being guided to element devices.

For example, the following case can be assumed.

An integrated optical transmitter has a function called internal loopback in which an optical signal usually transmitted to the outside of an integrated circuit is returned to the inside to perform self-diagnosis.

In cases of transmitting a signal outside the circuit, the light intensity is deteriorated by coupling loss to the optical fiber or the like. In performing inner loopback, part of light needs to be branched and discarded in order to simulate the same condition, and in such a case, an optical terminator is used.

Since laser in an integrated circuit tends to be destabilized by reflected return light, the optical terminator requires the ability to suppress light reflection to an extreme extent.

Figure 69:
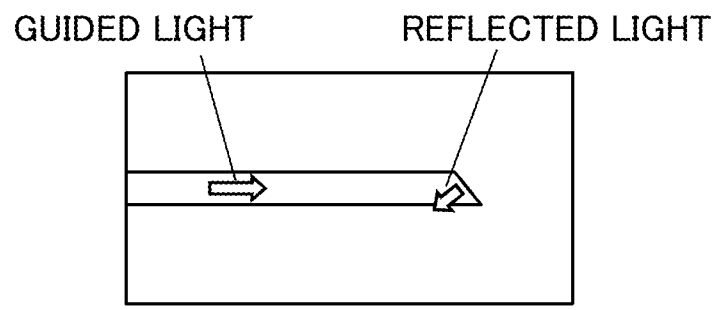
FIG. 69 is a plan view (top view) illustrating a conventional optical termination structure in which the end face is inclined with respect to a waveguide direction.
Figure 70:
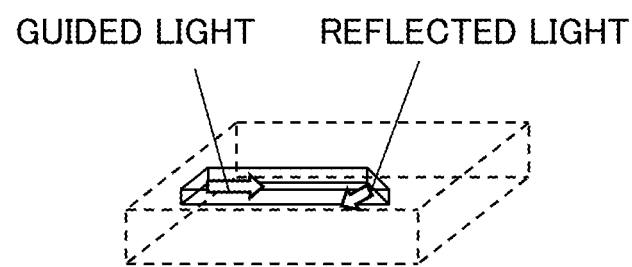
FIG. 70 is a perspective view illustrating a conventional optical termination structure in which the end face is inclined with respect to a waveguide direction.

One of the conventional techniques of an optical terminator has a method in which the end of the waveguide is inclined with respect to the optical axis to prevent the reflected return light from being recombined with the waveguide (see, for example, FIGS. 69 and 70).

Figure 67:
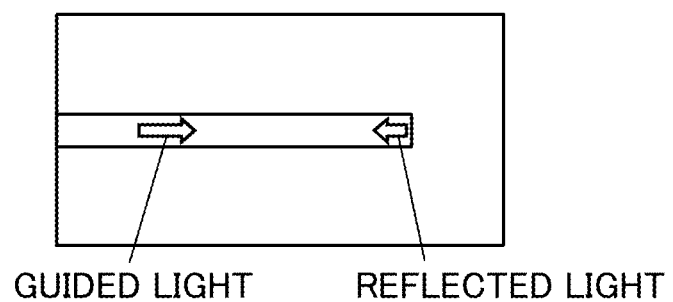
FIG. 67 is a plan view (top view) illustrating a conventional optical termination structure in which the end face is perpendicular to a waveguide direction.
Figure 68:
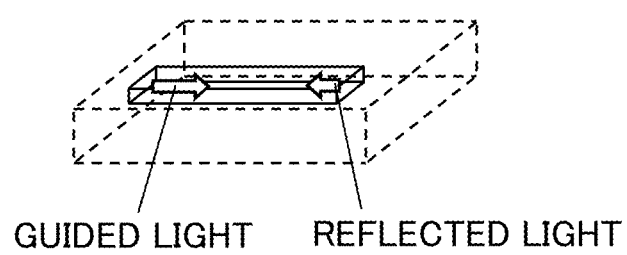
FIG. 68 is a perspective view illustrating a conventional optical termination structure in which the end face is perpendicular to a waveguide direction.

Compared to the structure in which the waveguide end is cut off perpendicularly to the optical waveguide direction (see, for example, FIGS. 67 and 68), reflected light in the end face is angled with respect to the waveguide direction and therefore has a difficulty in recombining, and is used as an optical terminator which can be easily formed.

Figure 71:
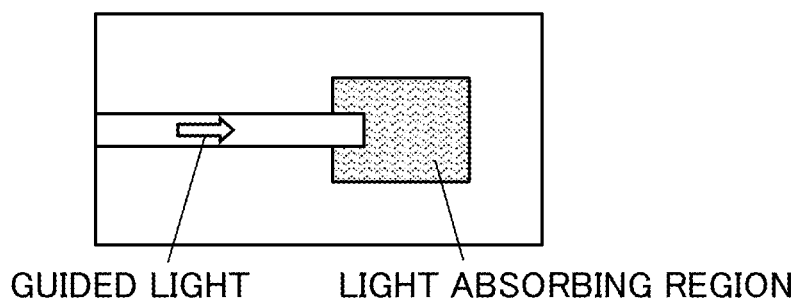
FIG. 71 is a plan view (top view) illustrating a conventional optical termination structure in which a light absorbing region is provided.
Figure 72:
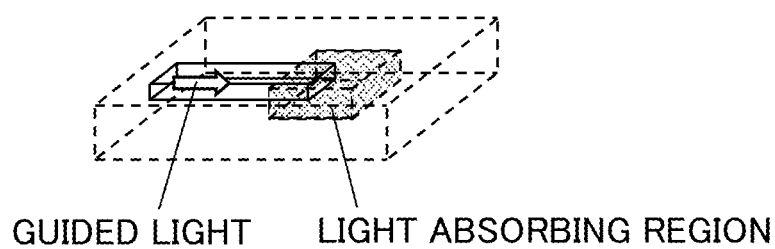
FIG. 72 is a perspective view illustrating a conventional optical termination structure in which a light absorbing region is provided.

In addition, a light absorbing region may be connected to an end of the waveguide to prevent reflection by means of optical absorption (see, for example, FIGS. 71 and 72).

Figure 73:
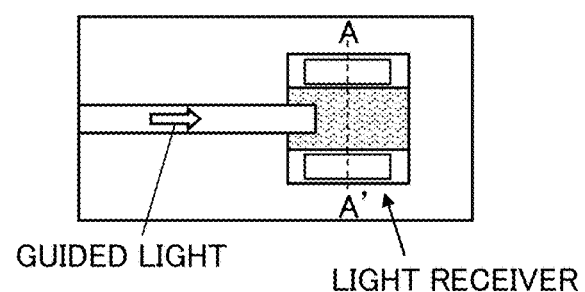
FIG. 73 is a plan view (top view) illustrating a conventional optical termination structure in which a light receiver is provided.
Figure 74:
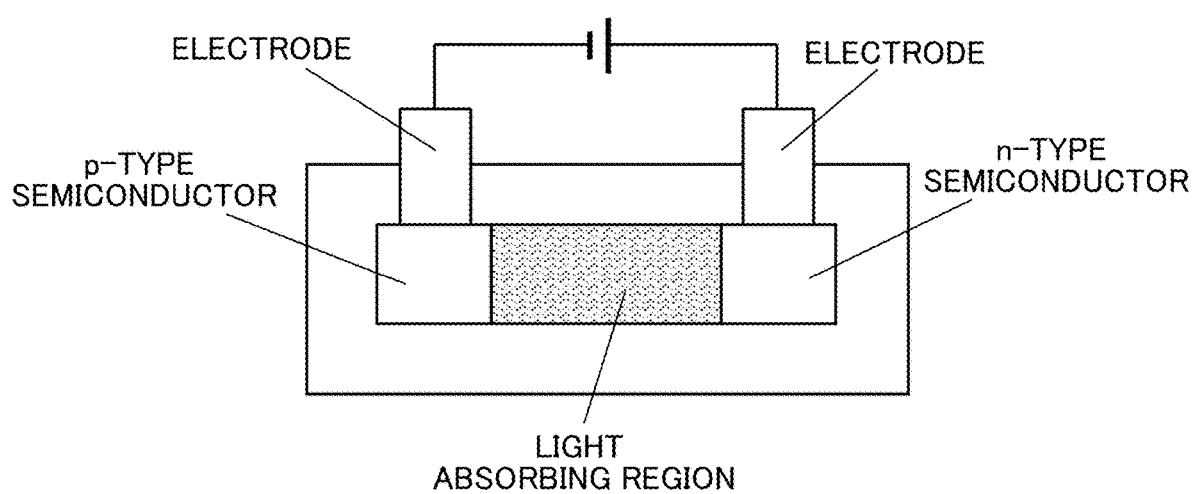
FIG. 74 is a cross-sectional view illustrating a conventional optical termination structure in which a light receiver is provided, the cross-sectional view being taken along line A-A' of FIG. 73.

The further developed method processes the light absorbing region into a light receiver and uses the light receiver as the optical terminator (see, for example, FIGS. 73 and 74).

FIGS. 73 and 74 illustrate a structure in which a reverse bias is applied to a PIN type semiconductor as an example of a typical light receiver.

However, although the structure using the oblique end face as illustrated in FIGS. 69 and 70 can be formed easily, this simple structure does not completely prevent the return light. For example, generation of reflection of about several percent is unavoidable, and therefore, the performance as an optical terminator is extremely unsatisfactory because the reflection impairs the stability of the light source.

In the structure using the light absorbing region as illustrated in FIGS. 71 and 72, when band-to-band transition of a semiconductor is used as the light absorbing mechanism, the light absorption coefficient is proportional to the state density (in the valence band) of filled electrons in the initial state and the state density (in the conduction band) of empty electrons in the final state.

In a semiconductor material to which an electric field is not applied, since electron-hole pairs generated by light absorption remain locally without drift which is generated by an electric field or the like, a state where holes in the valence band increase (i.e., filled electrons decrease) and electrons in the conduction band increase (i.e., empty electrons decrease) is caused so that the absorption coefficient lowers. Consequently, absorption saturation occurs relatively easily.

Therefore, when the light intensity is increased, the light is not sufficiently absorbed and the resultant remaining light is reflected, thereby impairing the characteristics of the optical terminator.

Although the occurrence of such absorption saturation is not avoidable completely, a method of using a PIN diode structure is proposed as a means for increasing the light intensity at which saturation occurs.

In the PIN diode structure, a built-in potential is generated by diffusion of majority carriers, and an electric field is applied to a depletion layer, so that electron-hole pairs generated by light absorption are spatially separated. For this reason, the above-mentioned decrease in the absorption coefficient is unlikely to occur, for example (see the built-in state on the left side of FIG. 75).

Figure 75:
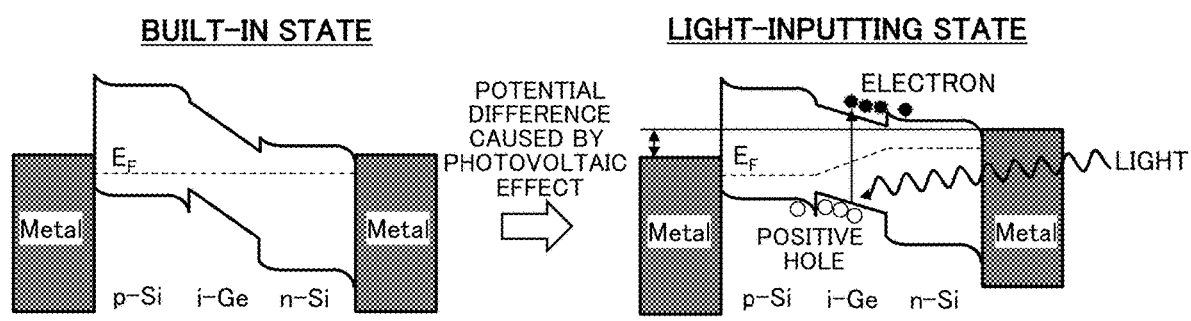
FIG. 75 is an energy band diagram of a built-in state and an energy band diagram under a light-inputting state in a conventional structure.

However, even in such a structure, since a potential difference is generated between the p- and n-polar regions due to the photovoltaic effect and the electric field intensity of the depletion layer is lowered, it is inevitable that the absorption saturation also occurs along with the increase of the light intensity (for example, see the light-inputting state on the right side of FIG. 75).

Further, in order to increase the saturated light intensity to achieve a function without problems in practical use, it is effective to separate, by applying an electric field from the outside, electron-hole pairs generated by light absorption, and as a means for separating the electron-hole pairs, a light receiver structure illustrated in FIGS. 73 and 74 can be used as an optical terminator.

However, requiring an external power source, this case requires a cost of installing the external power source and a cost of supplying power from the external power source.

For example, a transceiver such as a transceiver for a data center is required to have characteristics of low cost and low power consumption, so that the cost of constructing an additional electric circuit for an optical terminator and the additional power consumption for an optical terminator needs to be avoided.

Alternative to the above-mentioned band-to-band transition, various light absorption mechanisms can be applied.

However, in order to utilize the compatibility with CMOS manufacturing process, which is one of the advantages of Si-Photonics, semiconductors are preferably used as materials.

In addition to band-to-band transition, optical absorption mechanisms in semiconductors include, for example, a) band-to-impurity level transition, b) inter-impurity level transition, c) exciton absorption, and d) free carrier absorption.

However, a), b) and c) are inappropriate for use as an optical terminator because each having a narrow absorption wavelength band, which can be applied only to light of a particular wavelength, and being more likely to cause absorption saturation as compared to band-to-band absorption.

In addition, d) is also inappropriate as a component in an integrated device requiring miniaturization because having a much smaller absorption coefficient than that of the band-to-band absorption, and therefore requiring a large area for causing sufficient light absorption.

Therefore, a configuration such as the above-described embodiments and the modifications are adopted in order to prevent absorption saturation from occurring even if the light intensity increases and reliably suppress the reflected return light without using an external power source (i.e., without supplying power from the outside).

The following actions and effects can be obtained by adopting the configurations of the embodiments and the modifications described above.

As described above, a problem is that absorption saturation easily occurs when band-to-band transition of a semiconductor is used in a state in which an external electric field is not applied in the conventional structure.

Figure 2:
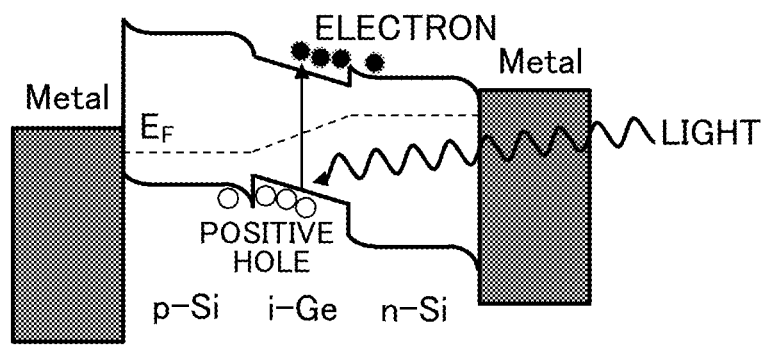
FIG. 2 is an energy band diagram in a conventional structure.

A PIN diode structure, which is less likely to saturate than a structure in which only light absorbing region is provided, causes absorption saturation at a relatively low light intensity when the electric field intensity of the depletion layer is lowered by the photovoltaic force (see, for example, FIG. 2).

As a solution to the above, it is possible to prevent generation of a potential difference between the P- and N-bipolar regions by employing a configuration of the above-described embodiments (specifically, the first structure, the second structure, and the third structure; for example, see FIGS. 3 to 25) and short-circuiting the P- and N-bipolar regions of the PIN structure with a conductor (for example, see FIG. 1).

That is, by adopting the configuration of the above-described embodiments (specifically, the first structure, the second structure, and the third structure; for example, see FIGS. 3 to 25), the electron-hole pairs generated in the depletion layer serving as the light absorbing region 2 are carried to the short-circuited conductor, and are annihilated in the conductor 5.

This suppresses a decrease in the electric field intensity due to the photovoltaic effect, and even if the light intensity increases, the electron-hole pairs continue to be spatially separated.

As a result, an empty level at which band-to-band transition can occur is continuously supplied, so that a decrease in the absorption coefficient is less likely to occur, and the characteristics of the optical terminator 6 are maintained even in a state where the light intensity is high.

In addition, since an electric field can be applied to the light absorbing region 2 under a state where electric power in not supplied from the outside, the photocarriers generated in the light absorbing region 2 are quickly transported to the bipolar regions 3, 4 by drift, and local accumulation of carriers is not generated. Therefore, absorption saturation hardly occurs, and reflection return light can be almost completely suppressed.

Further, the configurations of the above-described embodiments (specifically, the first structure, the second structure, and the third structure; for example, see FIGS. 3 to 25) do not require an external power source in order to maintain the electric field intensity of the depletion layer.

For this reason, no additional electronic circuit is required for achieving the function of optical terminator 6, which is an advantage in terms of manufacturing costs. Further, power supply is not necessary, which also brings advantages from the viewpoint of power consumption.

In particular, the embodiments described above (specifically, the first structure, the second structure, and the third structure; for example, see FIGS. 3 to 25) achieve the optical termination in the optical integrated device, and assumes the form of connecting to the optical waveguide 1 in the integrated device.

For this reason, the optical semiconductor device is formed of the first semiconductor layer 1X serving as optical waveguide 1 and the second semiconductor layer 2X which absorbs light by band-to-band transition.

Here, it is essential that the first semiconductor constituting the first semiconductor layer 1X has a property of transmitting light, and the second semiconductor constituting the second semiconductor layer 2X has a property of absorbing light. It is desirable that the band gap of the first semiconductor layer 1X is larger than the photon energy of the wavelength to be used, and the band gap of the second semiconductor layer 2X is smaller than the photon energy of the wavelength to be used.

In this case, the optical semiconductor device is configured such that the light is introduced from the first semiconductor layer 1X to the second semiconductor layer 2X.

Further, the above-described embodiments (specifically, the first structure, the second structure, and the third structure; for example, see FIGS. 3 to 25) provide the PIN diode type structure.

The light absorbing region 2 of the second semiconductor layer 2X is configured to include an i-type region 2A (intrinsic semiconductor region; non-conductive region; depletion region).

There are several possible arrangements of the p-type region (p-type semiconductor region; first conductive region) and the n-type region (n-type semiconductor region; second conductive region); the both p- and n-polarities may be provided to the first semiconductor layer 1X (see, for example, FIGS. 3 to 12), the both polarities may be provided to the second semiconductor layer 2X (see, for example, FIGS. 14 to 17), and the polarities may be provided one on each of the first and second semiconductor layers 1X, 2X (see, for example, FIGS. 19 to 24).

In either case, it is satisfactory that the depletion layer region of the second semiconducting layer 2X may be electrically sandwiched between the p- and n-polar regions, so that the electron-hole pairs generated in the depletion layer may be separated and have respective paths through which the electrons and holes can propagate to the respective polar regions.

FIGS. 13, 18 and 25 are energy band diagrams along the paths for the respective cases.

As illustrated in, for example, FIGS. 9, 10, 16, 17, 23, and 24, the p- and n-polarity conductive regions may be each composed of multiple regions having different impurity densities, and it is desirable that the p- and n-polarity conductive region is each formed so as to have a particularly high impurity density in a region in contact with the conductor 5, so that the resistance (contact resistance) of the ohmic junction at the interface with the conductor 5 is low.

In particular, when the interface between the first semiconductor layer 1X and the second semiconductor layer 2X is a conductive region (impurity semiconductor region) as illustrated in, for example, FIGS. 9, 10, 23, and 24, an excessively high impurity density is not preferable from the viewpoint of reliability and the like because of increase in crystalline defect, and therefore, it may be desirable to increase the impurity density only at the interface with the conductor 5.

Further, for example, as illustrated in FIGS. 3 to 10, 14 to 17, and 19 to 24, the optical semiconductor device may have a structure in which the second semiconductor layer 2X is loaded on the first semiconductor layer 1X, or a structure in which a recess 1Y is provided to the first semiconductor layer 1X and the second semiconductor layer 2X is embedded in the recess 1Y as illustrated in FIGS. 11 and 12, for example.

The former is a structure in which incident light from the optical waveguide 1 formed of the first semiconductor layer 1X gradually propagates to and is absorbed in the second semiconductor layer 2X by evanescent light coupling. The latter is a structure in which light is directly coupled to the second semiconductor layer 2X by butt coupling, and has advantages in that light can be absorbed by a shorter structure.

Hereinafter, concrete configuration examples will be described with reference to FIGS. 26 to 66.

Here, a case where the structure of the present invention is applied to a part of an optical integrated circuit on a Si substrate used for a transceiver for a data center will be described as an example.

First, one example of the configuration will now be described with reference to FIGS. 26 to 39.

Here, the following description assumes a case of manufacturing the optical semiconductor device having the structure (first structure) illustrated in FIGS. 9 and 10.

Figure 26:
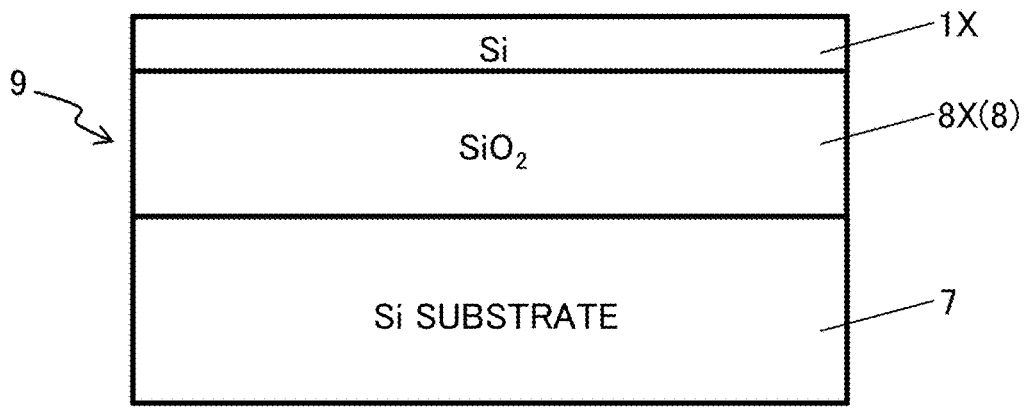
FIG. 26 is a cross-sectional view for explaining a concrete example of the configuration of the optical semiconductor device according to the present embodiment.

For example, as illustrated in FIG. 26, the manufacturing uses an SOI (Si on Insulator) substrate 9 in which an $SiO_2$ layer (called a BOX layer) 8X is formed on a Si substrate 7 and a thin Si layer 1X is formed on the upper portion of the BOX layer.

Here, the Si substrate 7, the $SiO_2$ layer 8X, and the upper Si layer (SOI layer) 1X constituting the SOI substrate 9 have thicknesses of about 750 µm, about 2 µm, and about 250 nm, respectively, for example.

Hereinafter, for the sake of simplicity, the Si substrate 7 is not illustrated except for some of the drawings. In addition, the optical integrated circuit has a structure that requires steps of, for example, doping for a modulator, a light receiver, or the like in addition to those performed for the present structure, but description of such a step is omitted here.

Figure 27:
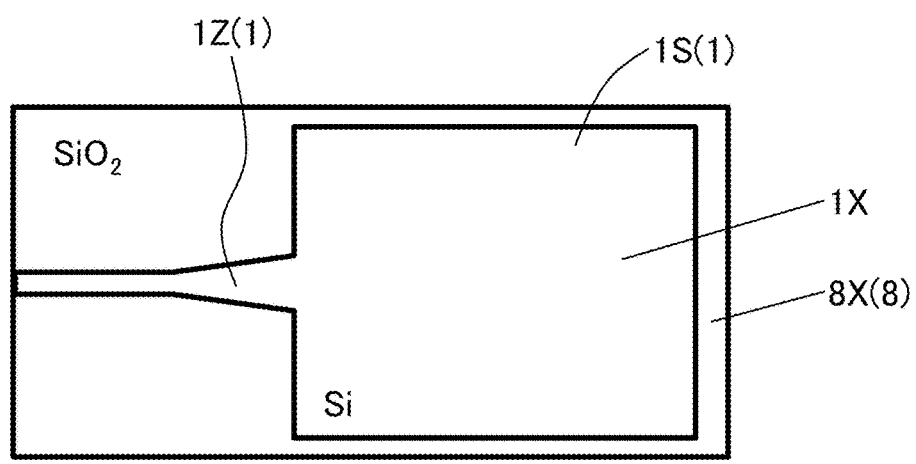
FIG. 27 is plan view (top view) for explaining a concrete example of the configuration of the optical semiconductor device according to the present embodiment.

First of all, as illustrated in FIG. 27, a desired optical waveguide shape is obtained by processing the upper Si layer (first semiconductor layer) 1X by means of, for example, EB (Electron Beam) lithography and ICP (Inductive Coupled Plasma) dry etching.

Figure 28:
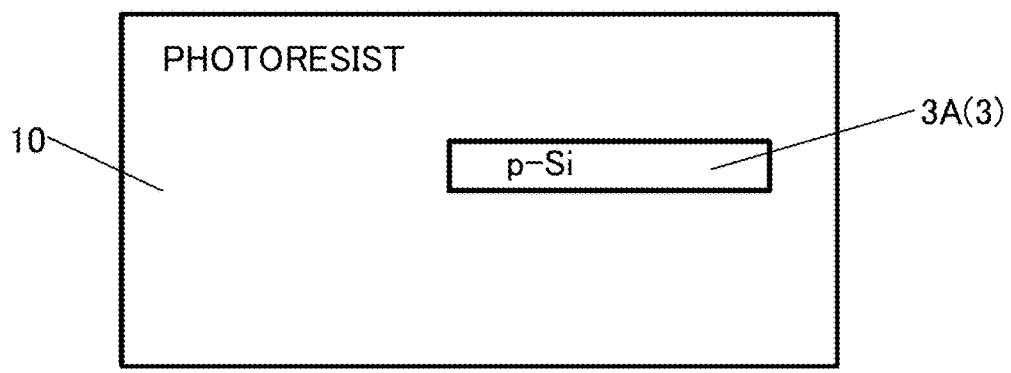
FIG. 28 is plan view (top view) for explaining a concrete example of the configuration of the optical semiconductor device according to the present embodiment.

Here, as illustrated in the top view FIG. 28, the Si waveguide 1 that guides the incident light to the Ge absorbing layer 2X (Ge layer; the second semiconductor layer; the light absorbing region 2) is formed. That is, the Si waveguide 1 is formed which includes an Si mode converter (tapered structure 1Z in which the waveguide width provided in the light-incident region changes) for widening the waveguide mode and a wide Si die pad 1S that is to be provided with a PD structure and that is formed by forming a mesa (Ge mesa) of a Ge layer 2X after the Si mode converter is formed.

Next, as illustrated in FIG. 28, a resist mask 10 is formed on the entire surface by, for example, photolithography, and then ion implantation is performed to give the p-type conductivity to a part of an Si die pad 1S and thereby a p-type region 3A (p-type semiconducting region; first conductive region 3) is formed.

For example, boron (B) ions are implanted so that the impurity density becomes about 2E18 [$cm^{-3}$].

Figure 29:
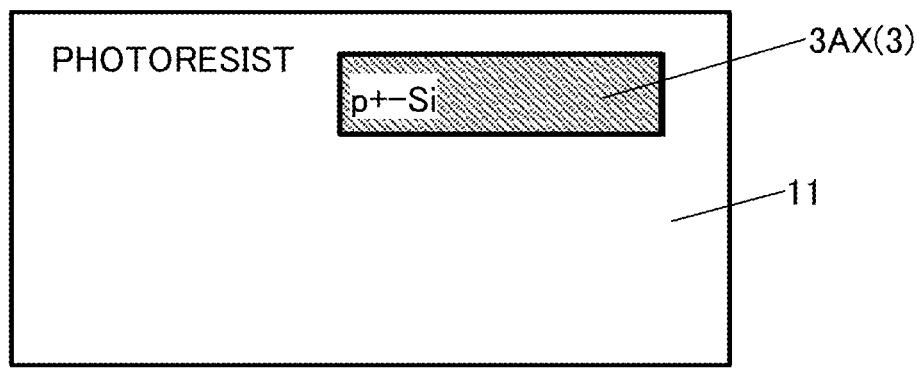
FIG. 29 is plan view (top view) for explaining a concrete example of the configuration of the optical semiconductor device according to the present embodiment.

After that, as illustrated in FIG. 29, the resist is removed, and another resist mask 11 is formed by, for example, photolithography, and a $p^+$ type region 3AX (high impurity density region) is formed by giving the $p^+$ type conductivity to another part of Si die pad 1S.
For example, B ions are implanted so that the impurity density becomes about 1E19 [$cm^{-3}$].

Figure 30:
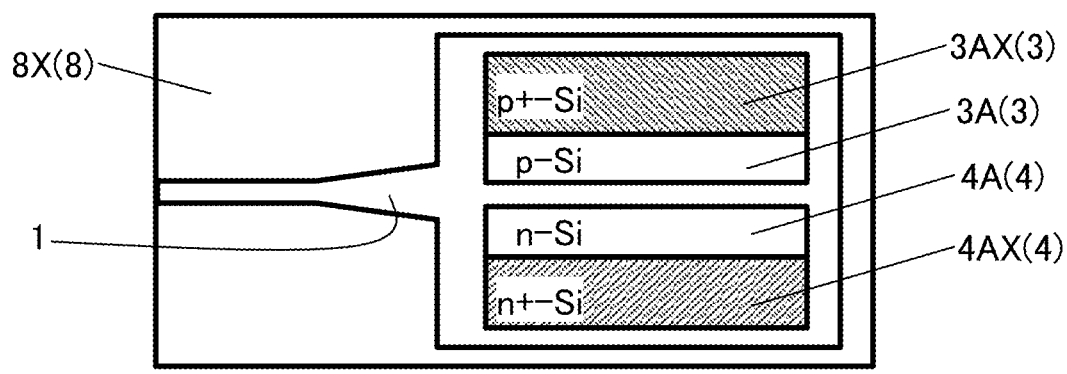
FIG. 30 is plan view (top view) for explaining a concrete example of the configuration of the optical semiconductor device according to the present embodiment.

Similarly, resist mask forming and ion implantation are repeated to form an n-type region 4A (n-type semiconductor region; second conductive region 4) and an $n^+$ type region 4AX (high impurity density region), as illustrated in FIG. 30.

Here, when the n-type region is formed, for example, P (phosphorus) ions are implanted to set the impurity density to about 2E18 [$cm^{-3}$], and when $n^+$ type region is formed, P (phosphorus) ions are implanted to set the impurity density to 1E19 [$cm^{-3}$].

Figure 31:
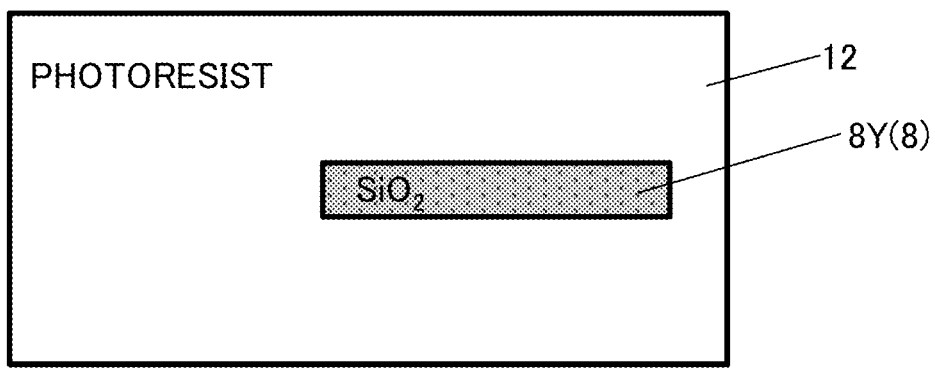
FIG. 31 is plan view (top view) for explaining a concrete example of the configuration of the optical semiconductor device according to the present embodiment.

FIG. 30 is a top view illustrating a state in which the resist is removed after these steps. Then, as illustrated in FIG. 31, an $SiO_2$ film 8Y is formed at a thickness of about 20 nm on the entire surface by, for example, the CVD method, and annealing for activating the implanted impurity is performed.

For example, the dopant is activated by being placed in an atmosphere at about 1000° C. for about 1 minute.

Figure 32:
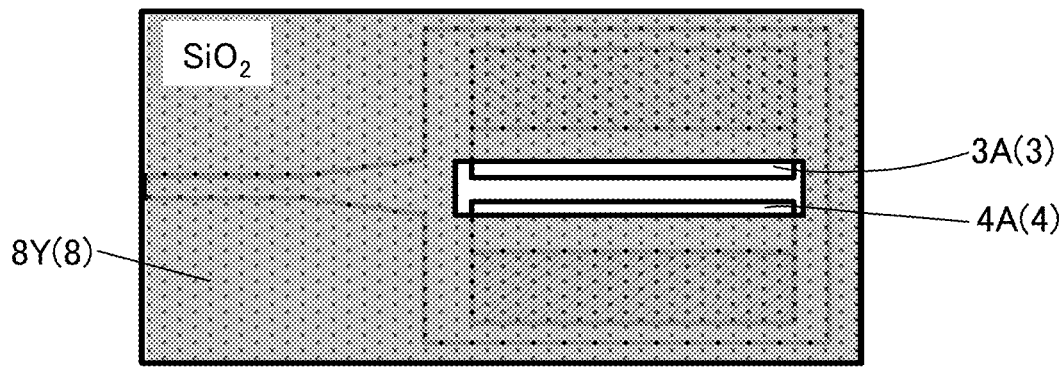
FIG. 32 is plan view (top view) for explaining a concrete example of the configuration of the optical semiconductor device according to the present embodiment.

Next, the resist mask 12 is formed by, for example, photolithography.
Next, as illustrated in FIG. 32, an $SiO_2$ film 8Y is patterned by dry-etching using the mask 12 to form a mask for selectively Ge growing. In this case, a Ge layer is formed only on the portion not covered with the $SiO_2$ film 8Y.
For easily understanding, the $SiO_2$ film serving as the mask is represented to be translucent.

Figure 33:
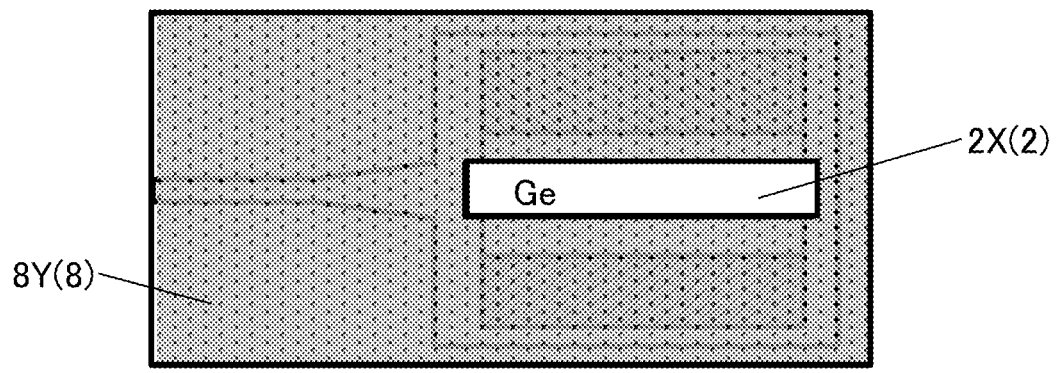
FIG. 33 is plan view (top view) for explaining a concrete example of the configuration of the optical semiconductor device according to the present embodiment.

Next, as illustrated in FIG. 33, a Ge layer 2X is grown into a mesa shape on the substrate prepared in the previous step by, for example, the LP-CVD method.

Here, the thickness of the Ge layer is assumed to be about 300 nm. The dimension of the Ge mesa are, for example, about 30 μm in overall length and about 2 μm in overall width.

Figure 34:
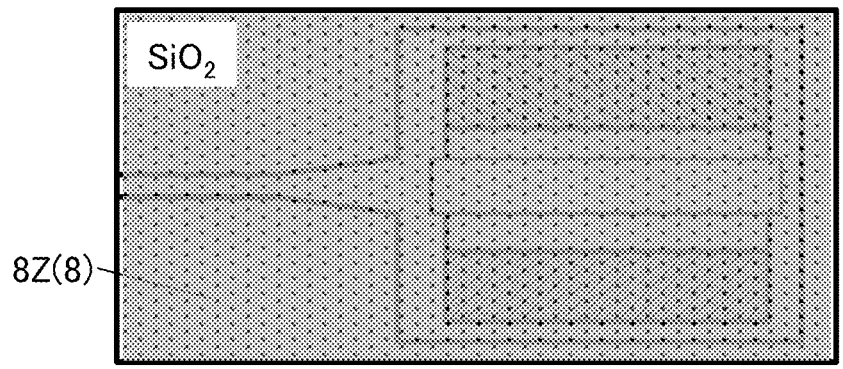
FIG. 34 is plan view (top view) for explaining a concrete example of the configuration of the optical semiconductor device according to the present embodiment.
Figure 35:
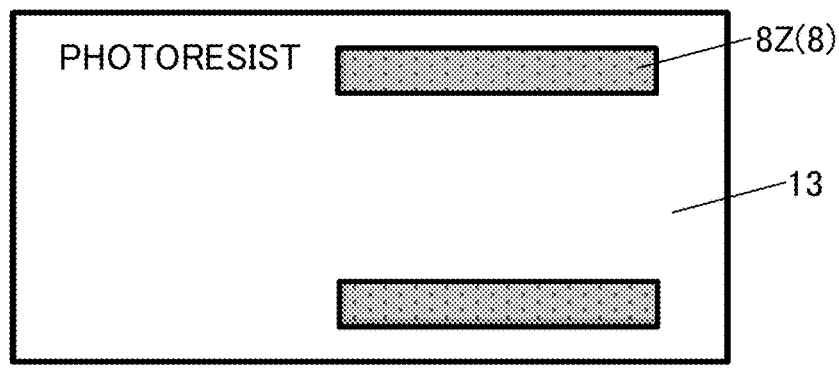
FIG. 35 is plan view (top view) for explaining a concrete example of the configuration of the optical semiconductor device according to the present embodiment.
Figure 36:
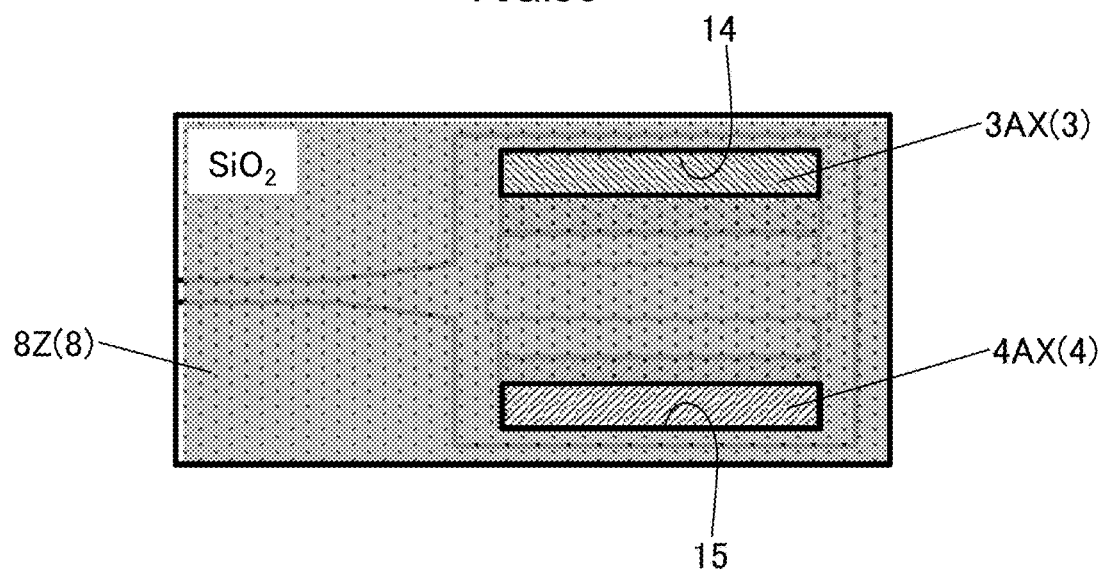
FIG. 36 is plan view (top view) for explaining a concrete example of the configuration of the optical semiconductor device according to the present embodiment.

Next, as illustrated in FIG. 34, an $SiO_2$ film 8Z is formed on the entire surface by, for example, the CVD method; as illustrated in FIG. 35, a resist mask 13 is formed by, for example, photolithography; and the $SiO_2$ film 8Z is processed (shaped) by dry etching using the resist mask 13 so that contact holes 14, 15 are formed such that only the regions forming metal contacts on the $p^+$ type region 3AX and the $n^+$ type region 4AX (p- and n-bipolar region) formed on the Si layer 1X are exposed, as illustrated in FIG. 36.

Figure 37:
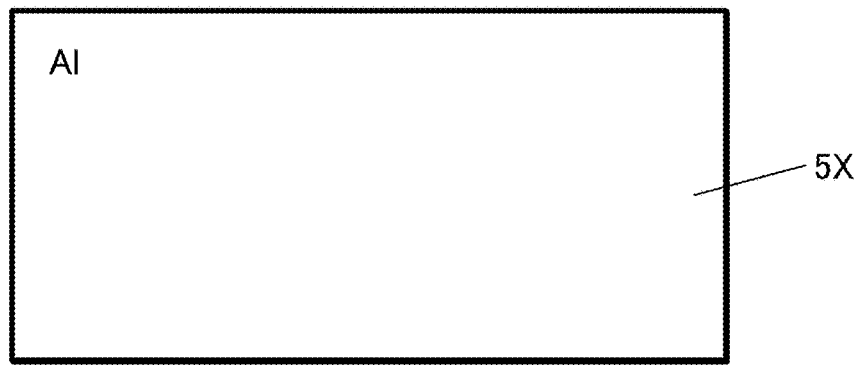
FIG. 37 is plan view (top view) for explaining a concrete example of the configuration of the optical semiconductor device according to the present embodiment.
Figure 38:
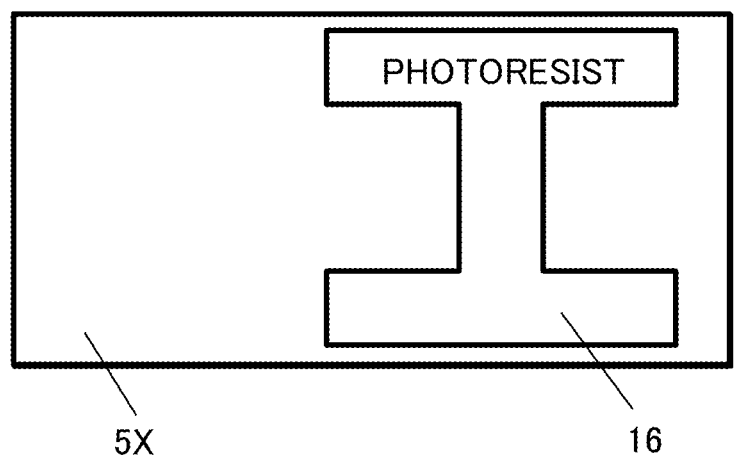
FIG. 38 is plan view (top view) for explaining a concrete example of the configuration of the optical semiconductor device according to the present embodiment.
Figure 39:
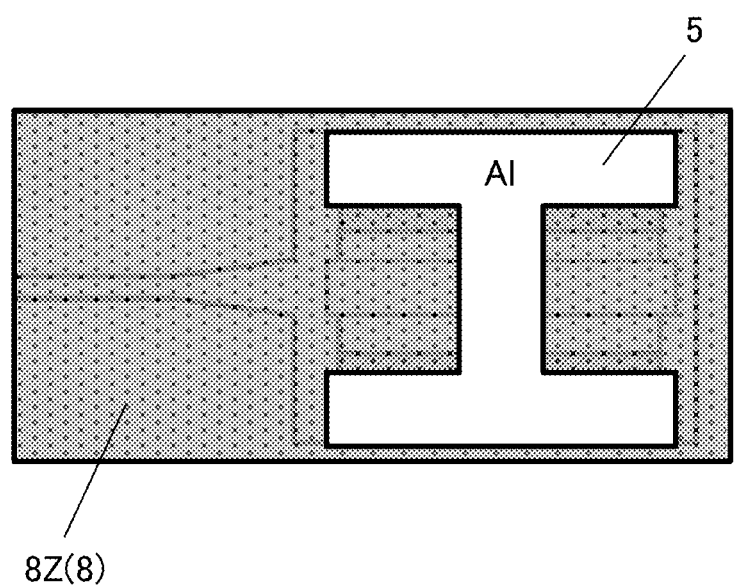
FIG. 39 is plan view (top view) for explaining a concrete example of the configuration of the optical semiconductor device according to the present embodiment.

Subsequently, as illustrated in FIG. 37, an Al film 5X is formed by, for example, a sputtering method; as illustrated in FIG. 38, a resist mask 16 is then formed only on a region where the Al film 5X is to be left by, for example, photolithography; and as illustrated in FIG. 39, an Al film 5X is processed (shaped) by, for example, dry etching so that the Al film 5 (metal film; conductors 5 extending from the first conductive region 3 to the second conductive region 4 so as to short-circuit the first conductive region 3 and the second conductive region 4) is formed in such a shape that the contact holes 14, 15 on the p- and n-bipolar regions 3AX, 4AX are covered and connected to each other. The Al film is also referred to as an Al electrode.

In the above manner, an optical semiconductor device having a structure (first structure) illustrated in FIGS. 9 and 10 can be manufactured.

Figure 3:
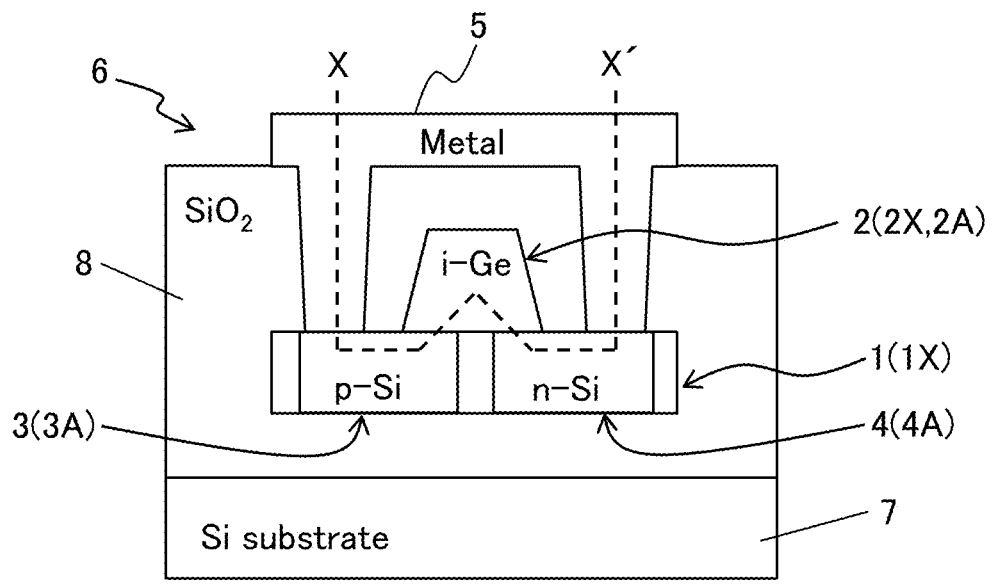
FIG. 3 is a cross-sectional view illustrating an example of the configuration of a first structure (in cases where the conductive regions having the both polarities are provided in a first semiconductor layer) of the optical semiconductor device according to the present embodiment.
Figure 4:
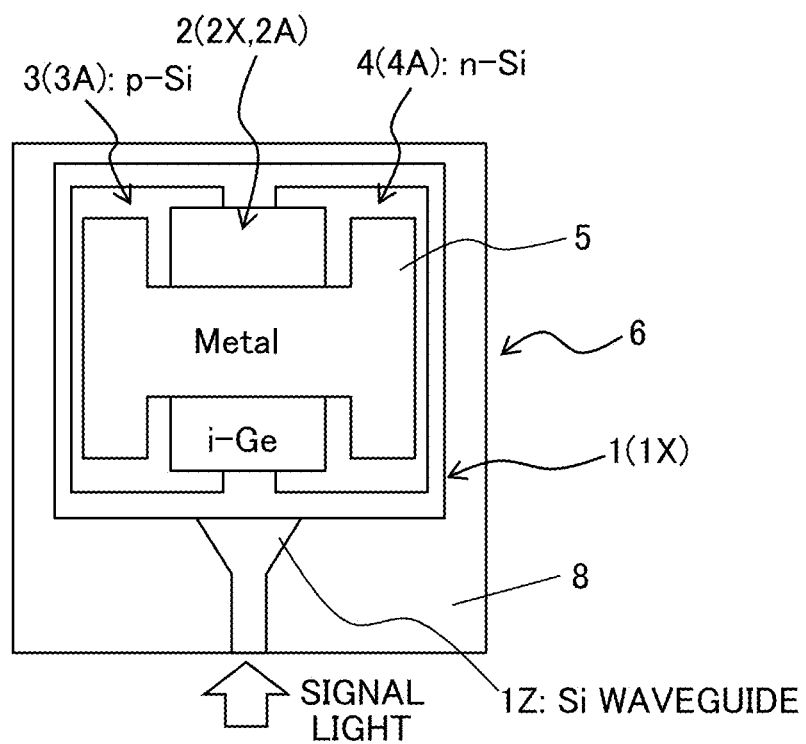
FIG. 4 is a plan view (a top view) illustrating an example of the configuration of a first structure (in cases where the conductive regions having the both polarities are provided in a first semiconductor layer) of the optical semiconductor device according to the present embodiment.

Alternatively, the optical semiconductor device having the structure (first structure) illustrated in FIGS. 3 and 4 can be manufactured by replacing the four ion implantations with only two p-type ion implantations and two n-type ion implantations in steps of FIGS. 28 to 30 and carrying out the remaining steps exactly the same as described above.

Further, during the above-described process, a recess 1Y is formed by etching the SOI layer 1X in a depth of about 100 nm, using the $SiO_2$ film 8Y as a mask, and in that state, a Ge layer 2X is grown by, for example, the LP-CVD method to form a mesa shape in the recessed 1Y and performing the same process as in FIGS. 34 to 39 described above thereafter. Consequently, it is possible to manufacture the optical semiconductor device having a structure (first structure) as illustrated in FIGS. 11 and 12.

Next, another example of the configuration will now be described with reference to FIGS. 40 to 53.

Here, description will now be made in relation to a case where an optical semiconductor device having a structure (third structure) in which the structure illustrated in FIGS. 21 and 22 and the structure illustrated in FIGS. 23 and 24 are combined is manufactured.

Figure 40:
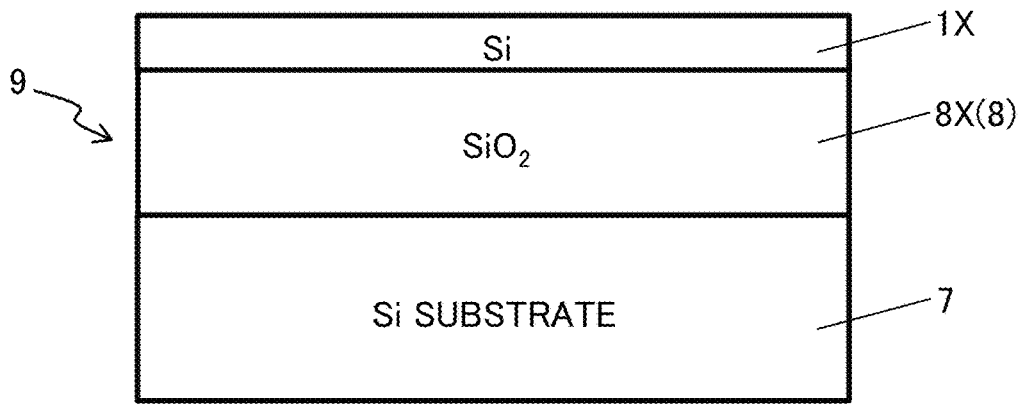
FIG. 40 is plan view (top view) for explaining a concrete example of the configuration of the optical semiconductor device according to the present embodiment.
Figure 41:
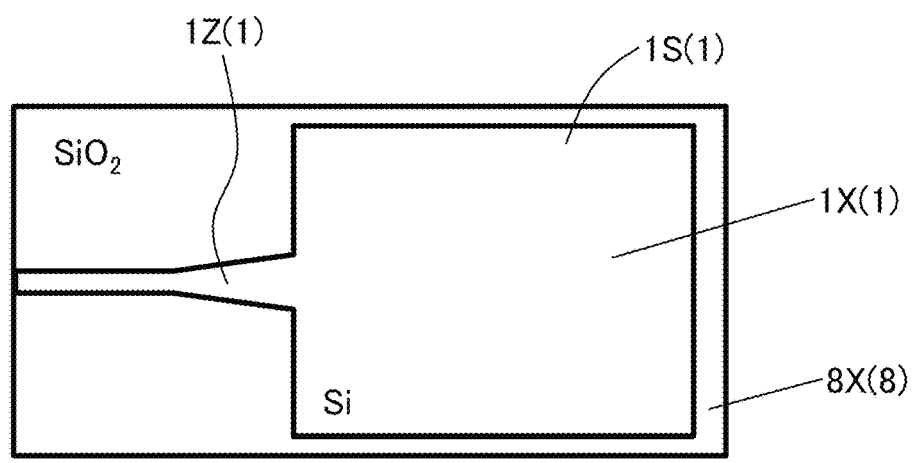
FIG. 41 is plan view (top view) for explaining a concrete example of the configuration of the optical semiconductor device according to the present embodiment.

First, as illustrated in FIGS. 40 and 41, the cross section of the substrate before being processed and processing of the SOI layer are the same as the description in the case of the above-described one example of the configuration (see FIGS. 26 and 27).

Figure 42:
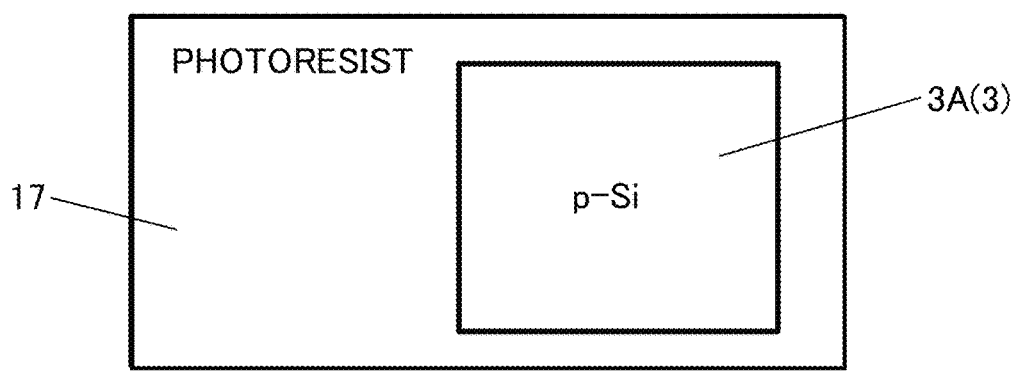
FIG. 42 is plan view (top view) for explaining a concrete example of the configuration of the optical semiconductor device according to the present embodiment.

Next, under a state where a resist mask 17 is formed on the entire surface by, for example, photolithography, and then ion implantation is performed as illustrated in FIG. 42, so that a p-type region 3A (p-type semiconducting region; first conductive region 3) is formed by giving part of Si die pad 1S the p-type conductivity.

For example, boron (B) ions are implanted so that the impurity density becomes about 2E18 [$cm^{-3}$].

Figure 43:
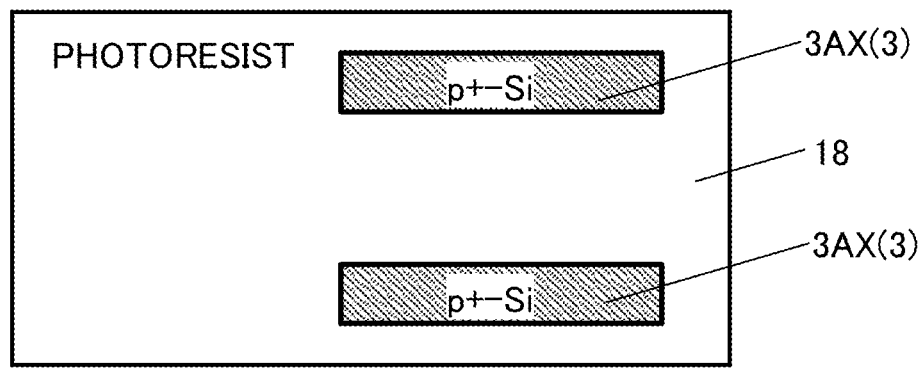
FIG. 43 is plan view (top view) for explaining a concrete example of the configuration of the optical semiconductor device according to the present embodiment.

After that, as illustrated in FIG. 43, the resist is removed, and another resist mask 18 is formed by, for example, photolithography, and a $p^+$ type region 3AX (high impurity density region) is formed by giving the $p^+$ type conductivity to another part of the Si die pad 1S.
For example, B ions are implanted so that the impurity density becomes about 1E19 [$cm^{-3}$].

Figure 44:
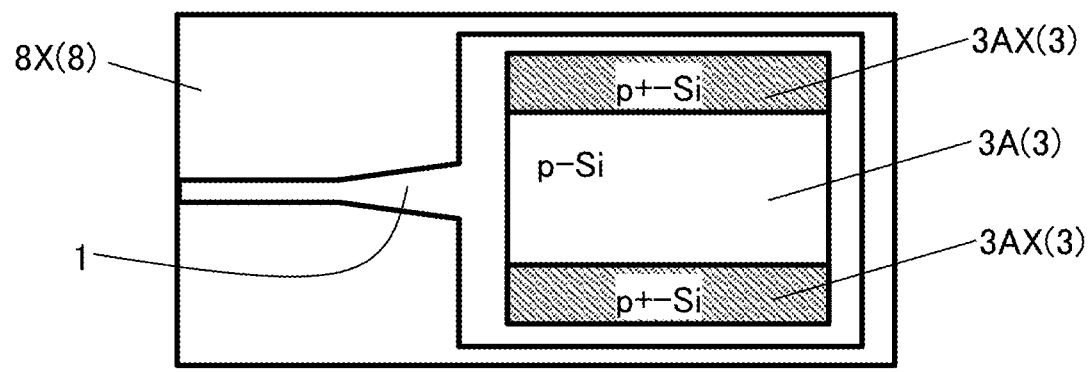
FIG. 44 is plan view (top view) for explaining a concrete example of the configuration of the optical semiconductor device according to the present embodiment.

FIG. 44 is a top view representing a state in which the resist is removed after this step.

Figure 45:
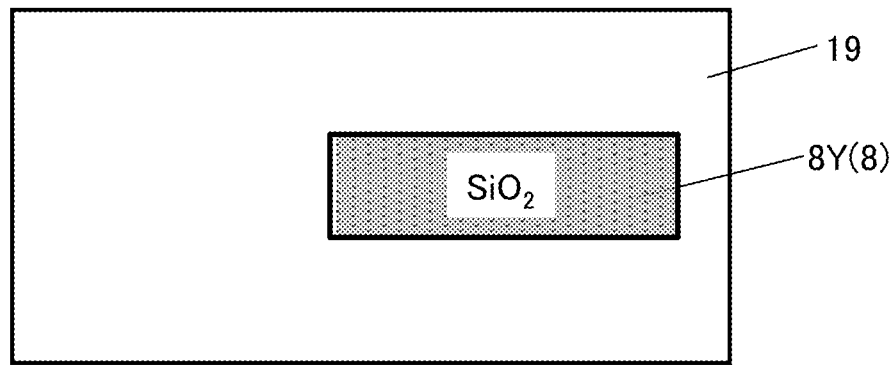
FIG. 45 is plan view (top view) for explaining a concrete example of the configuration of the optical semiconductor device according to the present embodiment.

After that, as illustrated in FIG. 45, the SiO$_2$ film 8Y is formed at a thickness of about 20 nm on the entire surface by, for example, the CVD method, and annealing for activating the implanted impurity is performed.

For example, the dopant is activated by being placed in an atmosphere at about 1000° C. for about 1 minute.

Next, the resist mask 19 is formed by, for example, photolithography.

Figure 46:
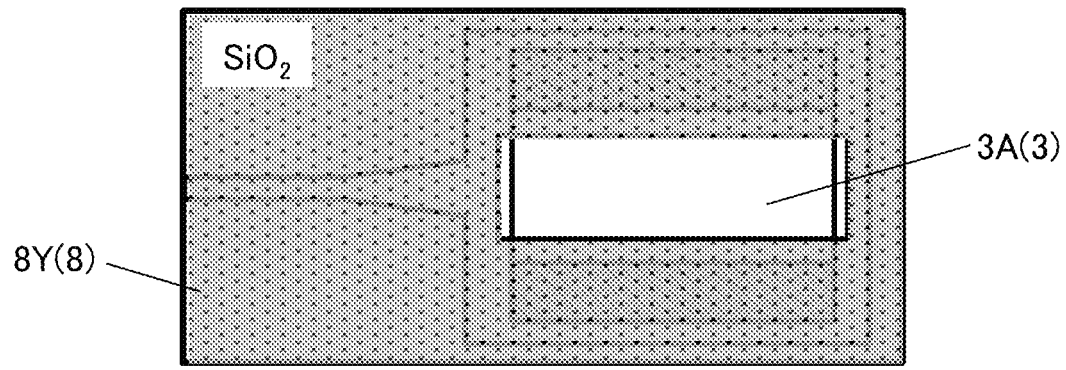
FIG. 46 is plan view (top view) for explaining a concrete example of the configuration of the optical semiconductor device according to the present embodiment.

Next, as illustrated in FIG. 46, an SiO$_2$ film 8Y is patterned by dry-etching using the mask 19 to form a mask for selectively Ge growing. In this case, a Ge layer 2X is formed only on the portion not covered with the SiO$_2$ film 8Y.

For easily understanding, the SiO$_2$ film serving as the mask is represented to be translucent.

Figure 47:
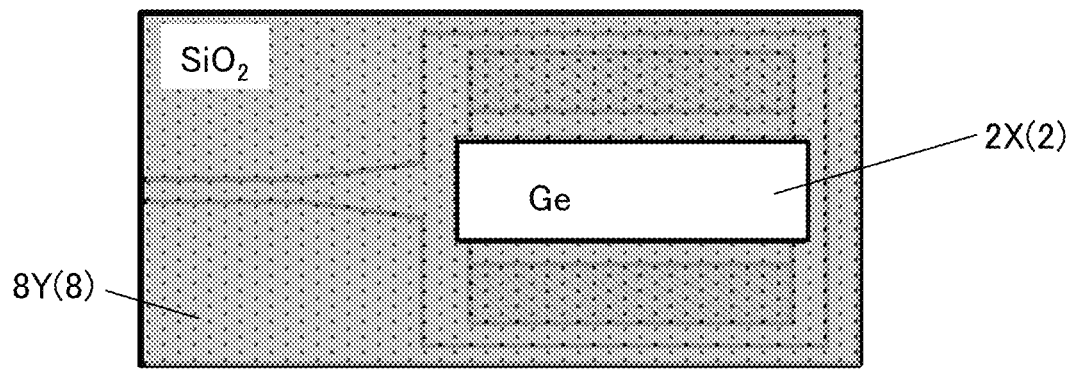
FIG. 47 is plan view (top view) for explaining a concrete example of the configuration of the optical semiconductor device according to the present embodiment.

Next, as illustrated in FIG. 47, a Ge layer 2X is grown into a mesa shape on the substrate prepared in the previous step by, for example, the LP-CVD method.

Here, the thickness of the Ge layer is assumed to be about 300 nm. The dimension of the Ge mesa is, for example, about 30 μm in overall length and about 5 μm in overall width.

Figure 48:
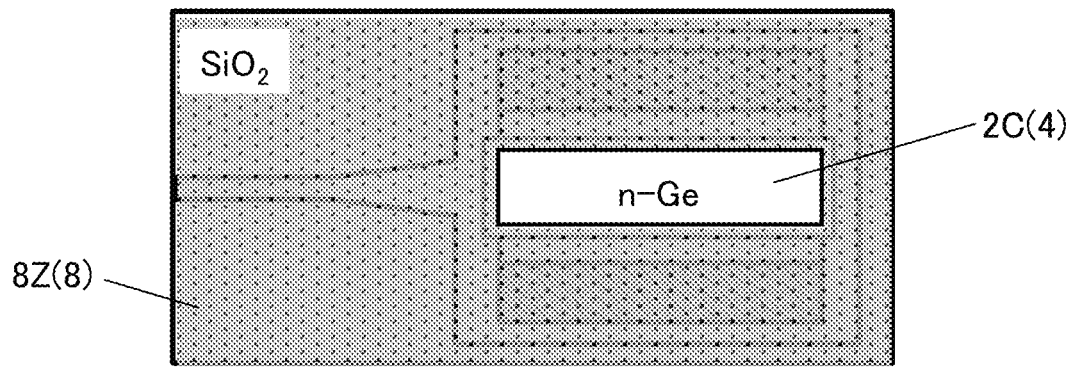
FIG. 48 is plan view (top view) for explaining a concrete example of the configuration of the optical semiconductor device according to the present embodiment.

Next, as illustrated in FIG. 48, under a state where an SiO$_2$ film 8Z is formed on the entire surface by, for example, the CVD method and a resist mask (not illustrated) is formed by, for example, photolithography, ion implantation is performed to give a part of the Ge mesa 2X the n-type conductivity, and thereby an n-type region 2C (n-type semiconductor region; second conductive region 4) is formed. For example, P (phosphorus) ions are implanted so that the impurity density becomes about 1E19 [cm$^{-3}$].

After that, the photoresist is removed, and annealing is performed to activate the impurity implanted into the Ge mesa.

For example, the dopant is activated by being placed in an atmosphere of about 600° C. for about 10 seconds.

Figure 49:
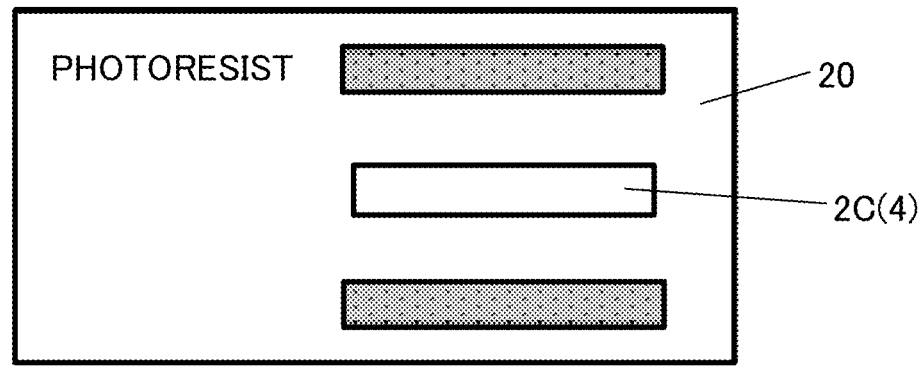
FIG. 49 is plan view (top view) for explaining a concrete example of the configuration of the optical semiconductor device according to the present embodiment.
Figure 50:
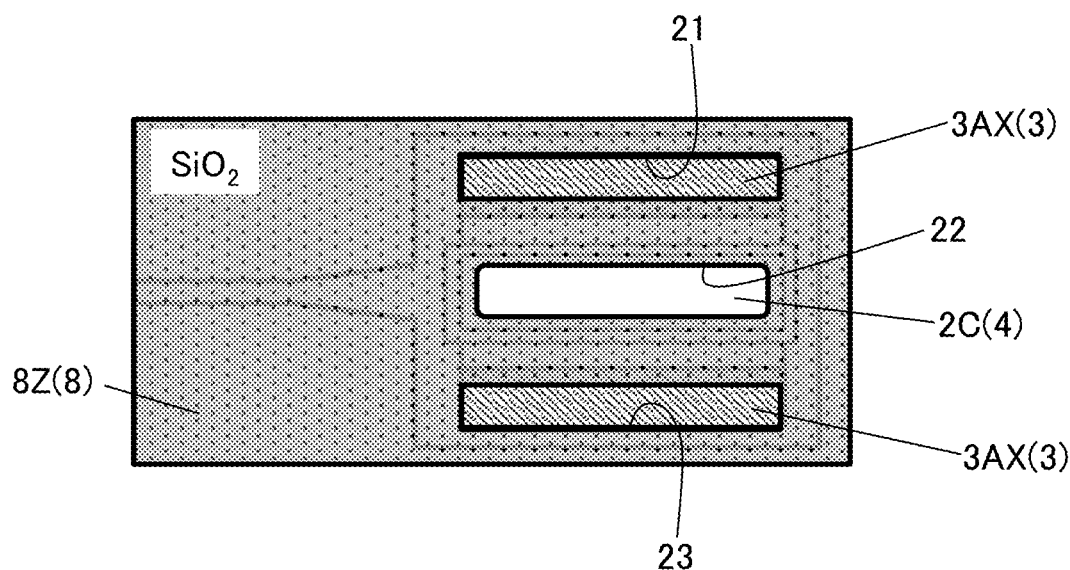
FIG. 50 is plan view (top view) for explaining a concrete example of the configuration of the optical semiconductor device according to the present embodiment.

Next, as illustrated in FIG. 49, a resist mask 20 is formed by, for example, photolithography, and the SiO$_2$ film 8Z is processed (shaped) by dry etching using the resist mask 20 to form contact hole 21 to 23 such that only the regions forming the metal contacts on p$^+$ type region 3AX formed on the Si layer 1X and the n-type region 2C (p- and n-bipolar region) formed on the Ge mesa 2X are exposed, as illustrated in FIG. 50.

Figure 51:
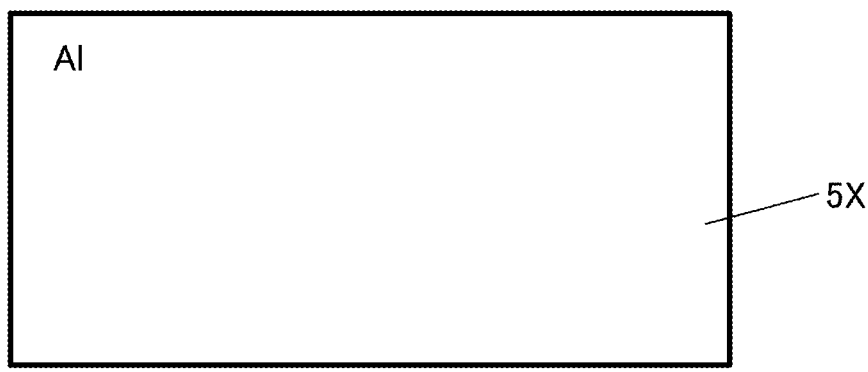
FIG. 51 is plan view (top view) for explaining a concrete example of the configuration of the optical semiconductor device according to the present embodiment.
Figure 52:
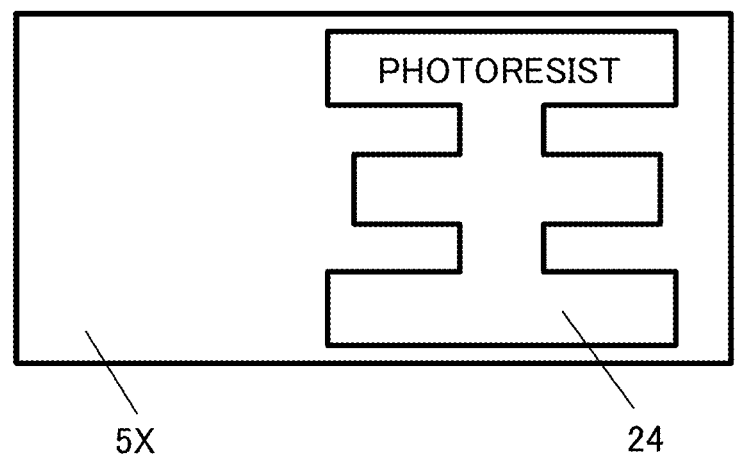
FIG. 52 is plan view (top view) for explaining a concrete example of the configuration of the optical semiconductor device according to the present embodiment.
Figure 53:
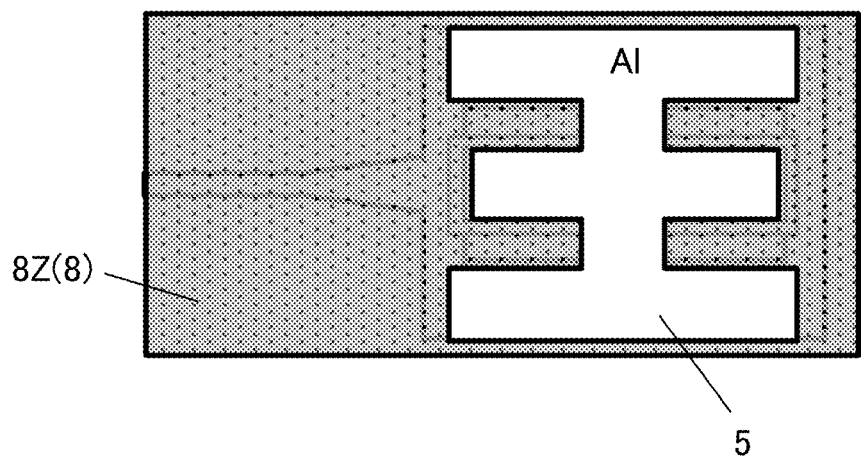
FIG. 53 is plan view (top view) for explaining a concrete example of the configuration of the optical semiconductor device according to the present embodiment.

Subsequently, as illustrated in FIG. 51, an Al film 5X is formed by, for example, a sputtering method; as illustrated in FIG. 52, a resist mask 24 is then formed only in a region where the Al film 5X is to be left by, for example, photolithography; and as illustrated in FIG. 53, an Al film 5X is processed (shaped) by, for example, dry etching so that the Al film 5 (metal film; conductors 5 extending from the first conductive region 3 to the second conductive region 4 so as to short-circuit the first conductive region 3 and the second conductive region 4) is formed in such a shape that the contact holes 21-23 on the p- and n-bipolar regions 3AX, 2C are covered and connected to each other. The Al film is also referred to as an Al electrode.

Figure 21:
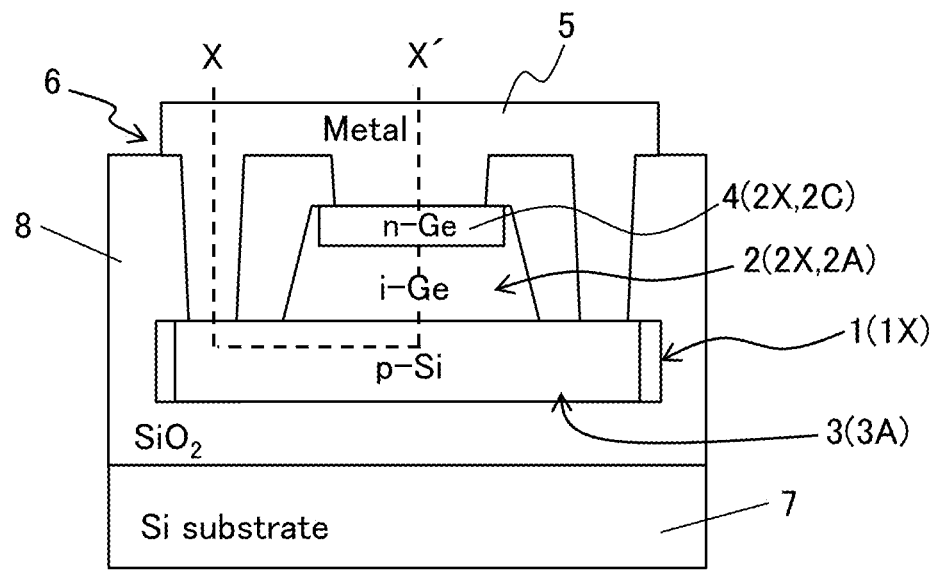
FIG. 21 is a cross-sectional view illustrating another example of a configuration of a third structure (in cases where the conductive regions having different polarities are provided one in each of a first semiconductor layer and a second semiconductor layer) of the optical semiconductor device according to the present embodiment.
Figure 22:
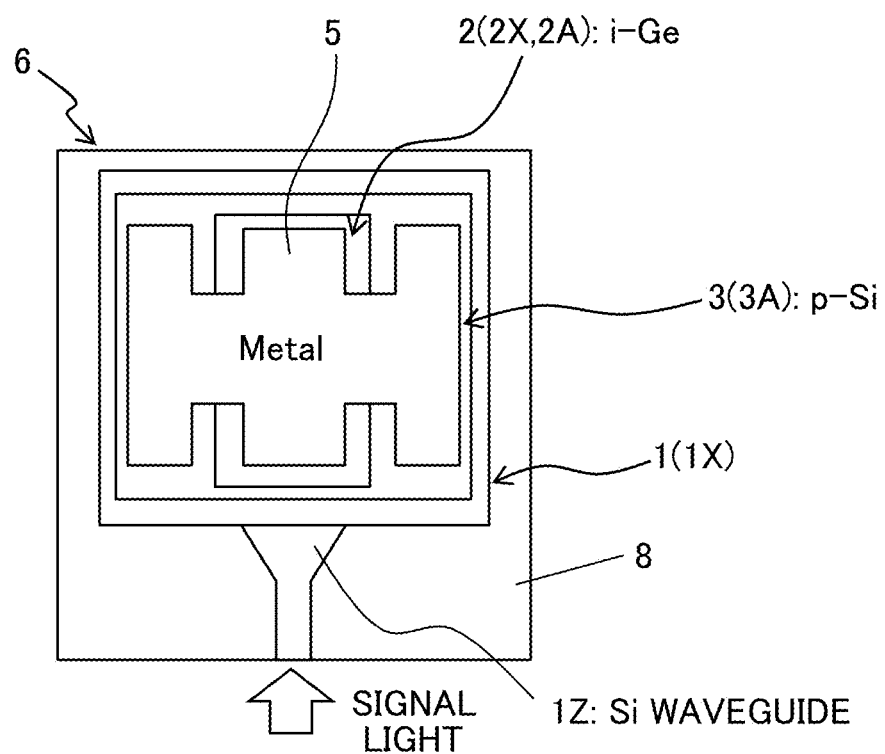
FIG. 22 is a plan view (a top view) illustrating another example of a configuration of a third structure (in cases where the conductive regions having different polarities are provided one in each of a first semiconductor layer and a second semiconductor layer) of the optical semiconductor device according to the present embodiment.

In this manner, an optical semiconductor device having a structure (third structure) in which the structure illustrated in FIGS. 21 and 22 and the structure illustrated in FIGS. 23 and 24 are combined can be manufactured.

The optical semiconductor device having a structure (third structure) illustrated in FIGS. 21 and 22 can be manufactured by omitting the step of FIG. 43 and carrying the remaining steps of the above process.

In the above-described steps, the optical semiconductor device having a structure (third structure) as illustrated in FIGS. 23 and 24 can be manufactured by forming the p$^+$ type region 3AX and the Al films 5 connected to the p$^+$ type region 3A only one side in the steps of FIGS. 43, 49, 50, 52, and 53.

Figure 19:
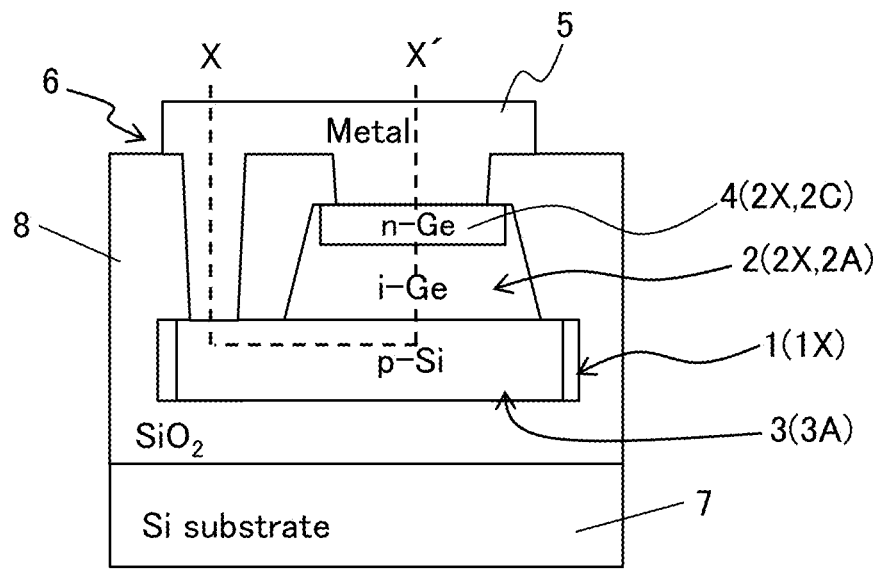
FIG. 19 is a cross-sectional view illustrating an example of a configuration of a third structure (in cases where the conductive regions having different polarities are provided one in each of a first semiconductor layer and a second semiconductor layer) of the optical semiconductor device according to the present embodiment.
Figure 20:
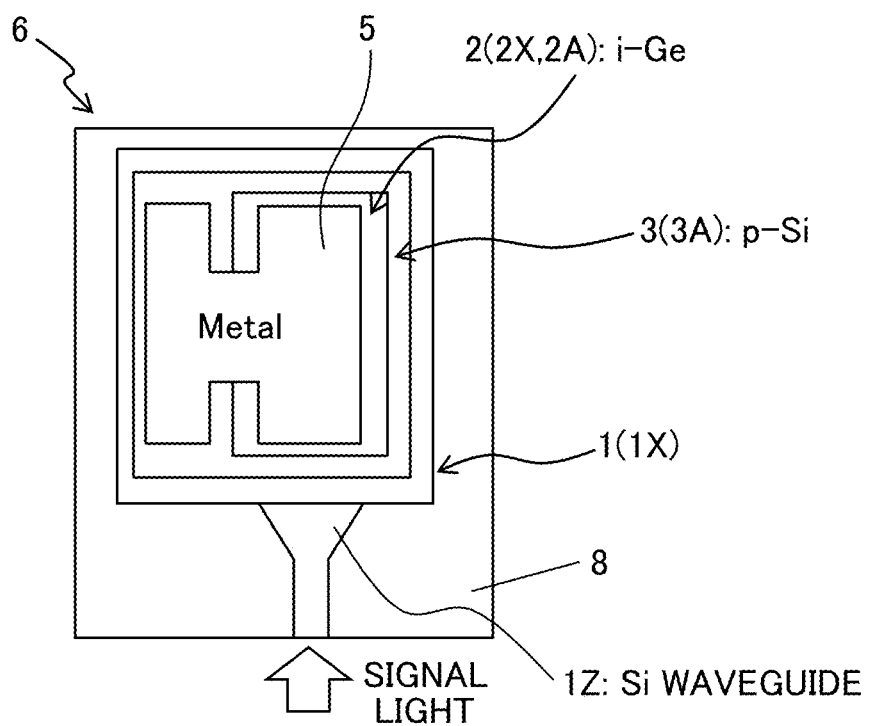
FIG. 20 is a plan view (a top view) illustrating an example of a configuration of a third structure (in cases where the conductive regions having different polarities are provided one in each of a first semiconductor layer and a second semiconductor layer) of the optical semiconductor device according to the present embodiment.

In the above-described steps, the optical semiconductor device having the structure (third structure) as illustrated in FIGS. 19 and 20 can be manufactured by omitting the step of FIG. 43 and carrying out the steps of FIGS. 49, 50, 52, and 53 on only one side of the Al film 5.

Figure 7:
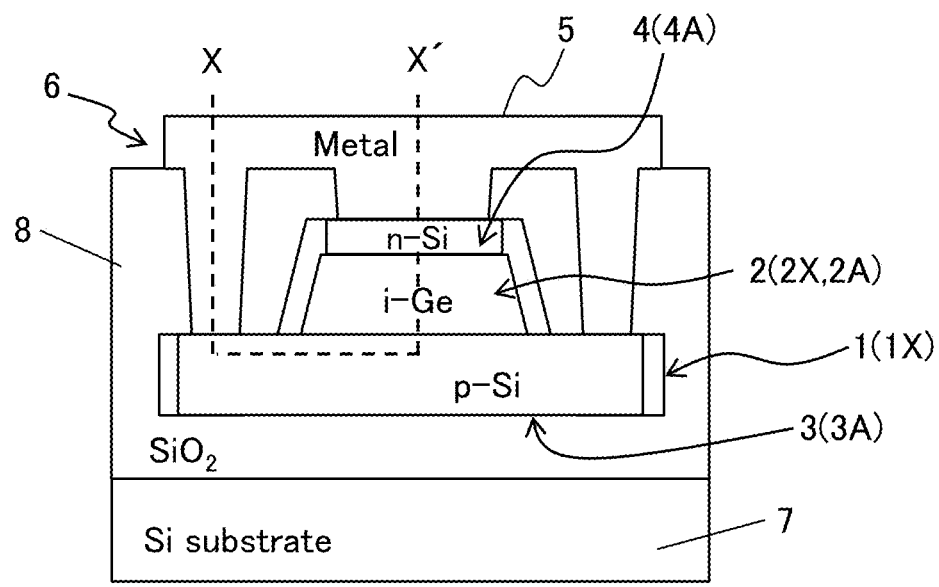
FIG. 7 is a cross-sectional view illustrating another example of the configuration of a first structure (in cases where the conductive regions having the both polarities are provided in a first semiconductor layer) of the optical semiconductor device according to the present embodiment.
Figure 8:
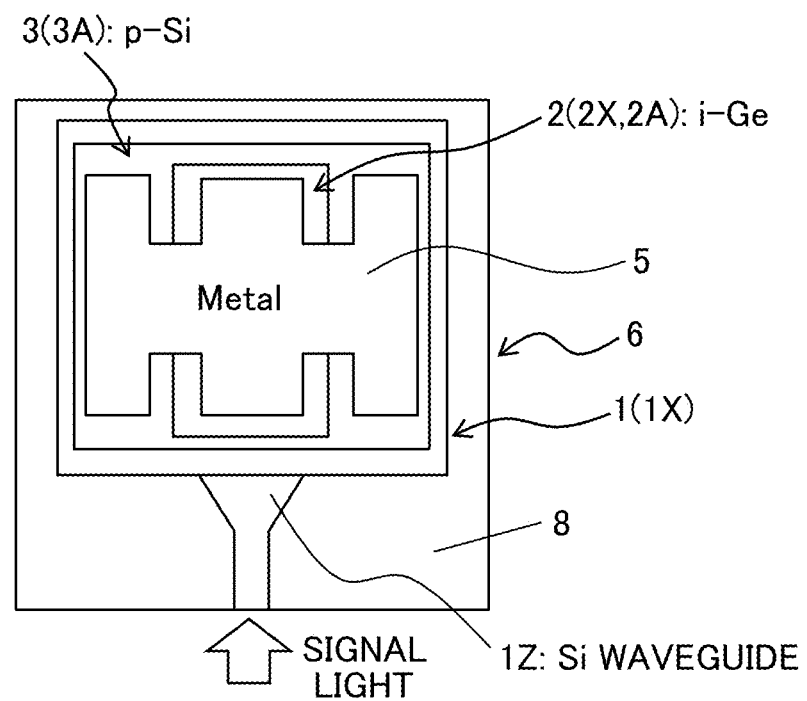
FIG. 8 is a plan view (a top view) illustrating another example of the configuration of a first structure (in cases where the conductive regions having the both polarities are provided in a first semiconductor layer) of the optical semiconductor device according to the present embodiment.

In addition, the optical semiconductor device having the structure (first structure) as illustrated in FIG. 7 and FIG. 8 can be manufactured by omitting the step of FIG. 43, growing the Si layer (first conductor layer) on the Ge layer 2X in the form of covering the Ge layer 2X by, for example, the LP-CVD method, and carrying out the remaining steps as those described above.

Figure 5:
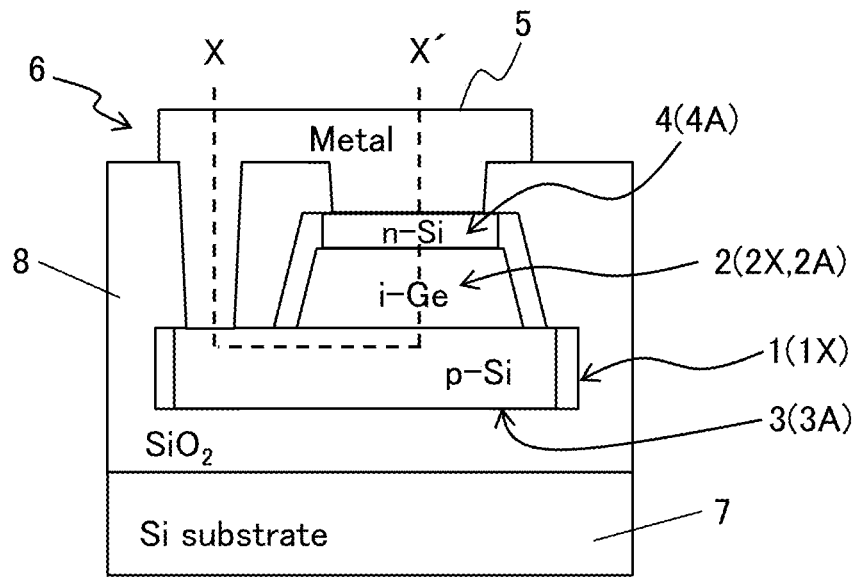
FIG. 5 is a cross-sectional view illustrating another example of the configuration of a first structure (in cases where the conductive regions having the both polarities are provided in a first semiconductor layer) of the optical semiconductor device according to the present embodiment.
Figure 6:
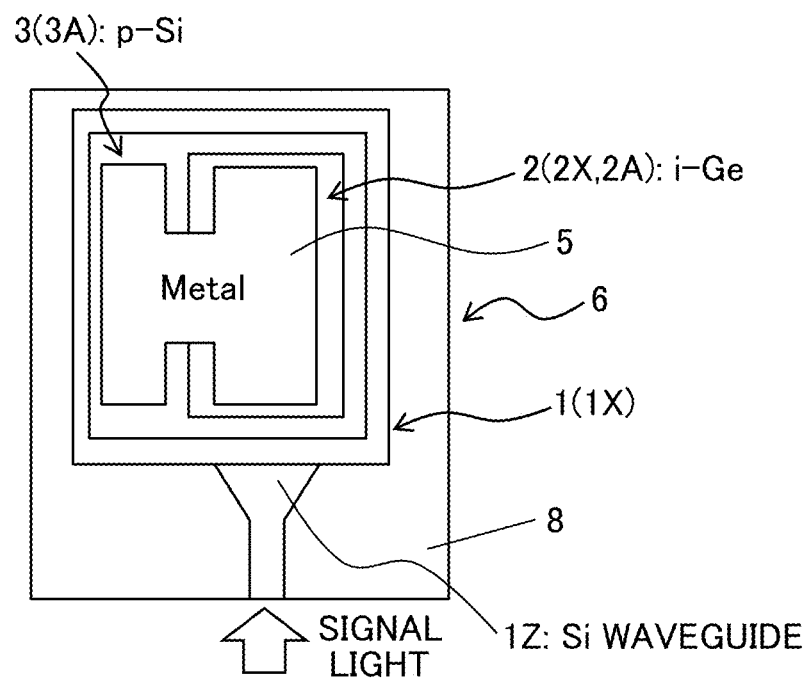
FIG. 6 is a plan view (a top view) illustrating another example of the configuration of a first structure (in cases where the conductive regions having the both polarities are provided in a first semiconductor layer) of the optical semiconductor device according to the present embodiment.

In addition, the optical semiconductor device having the structure (first structure) as illustrated in FIGS. 5 and 6 can be manufactured by omitting the step of FIG. 43, growing the Si layer on the Ge layer 2X in a form of covering the Ge layer 2X by, for example, the LP-CVD method, and by using the Al film 5 only on one side in the steps of FIGS. 49, 50, 52, and 53.

Next, another example of the configuration will be described with reference to FIGS. 54 to 66.

Here, the following description assumes a case of manufacturing the optical semiconductor device having the structure (second structure) as illustrated in FIGS. 16 and 17.

Figure 54:
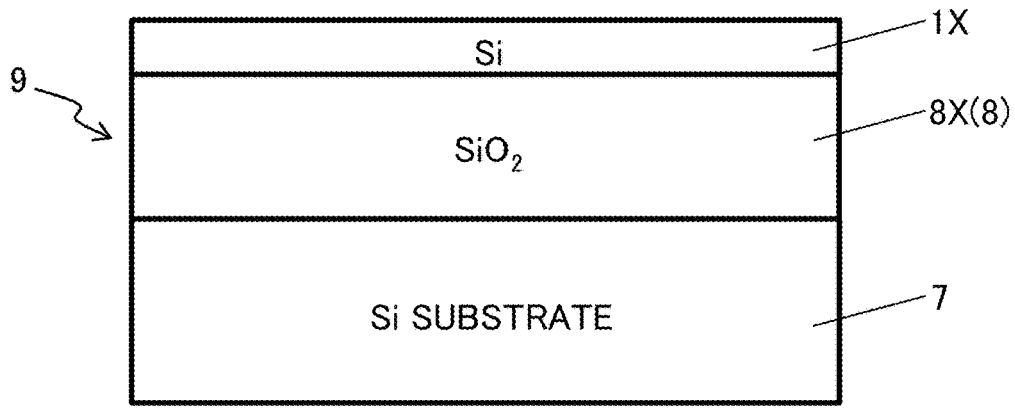
FIG. 54 is plan view (top view) for explaining a concrete example of the configuration of the optical semiconductor device according to the present embodiment.
Figure 55:
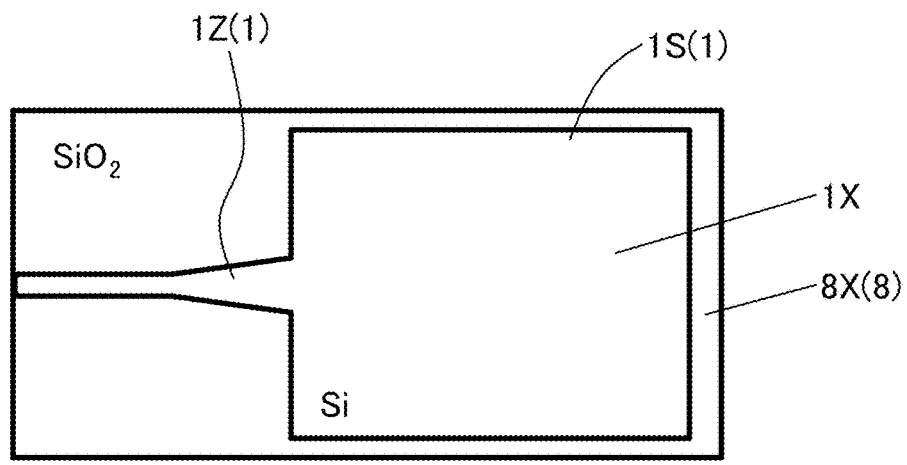
FIG. 55 is plan view (top view) for explaining a concrete example of the configuration of the optical semiconductor device according to the present embodiment.

First, as illustrated in FIGS. 54 and 55, the cross section of the substrate before being processed and processing of the SOI layer are the same as the description in the case of the above-described one example of the configuration (see FIGS. 26 and 27).

Figure 56:
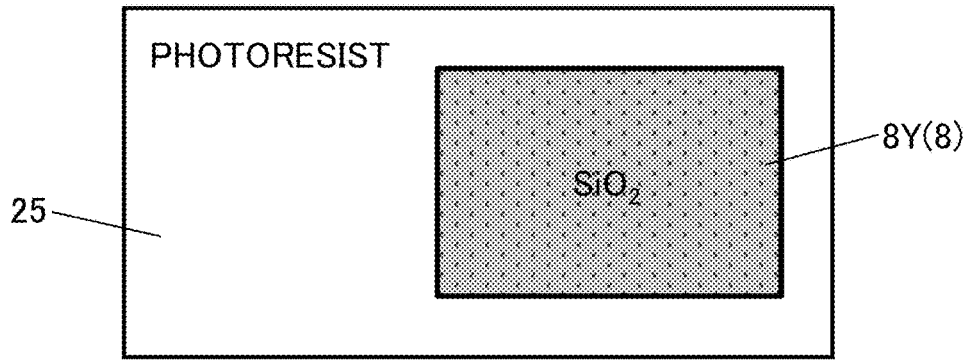
FIG. 56 is plan view (top view) for explaining a concrete example of the configuration of the optical semiconductor device according to the present embodiment.

Next, as illustrated in FIG. 56, the SiO$_2$ film 8Y is formed at a thickness of about 20 nm on the entire surface by, for example, the CVD method.

In succession, the resist mask 25 is formed by, for example, photolithography.

Figure 57:
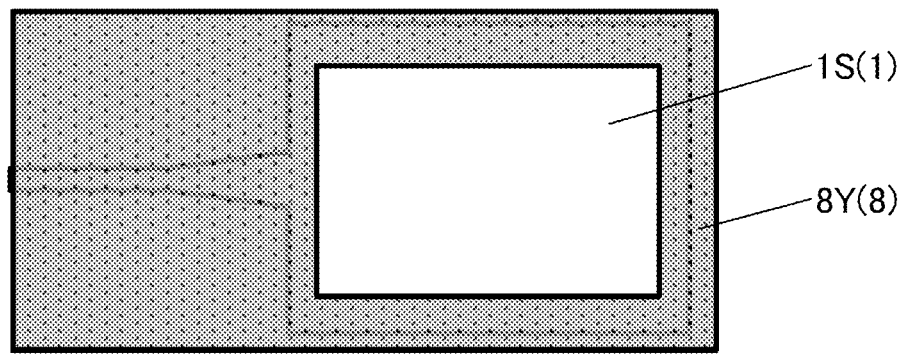
FIG. 57 is plan view (top view) for explaining a concrete example of the configuration of the optical semiconductor device according to the present embodiment.

Then, as illustrated in FIG. 57, an SiO$_2$ film 8Y is patterned by dry-etching using the mask 25 to form a mask for selectively Ge growing. In this case, a Ge layer is formed only on the portion not covered with the SiO$_2$ film 8Y.

For easily understanding, the SiO$_2$ film serving as the mask is represented to be translucent.

Figure 58:
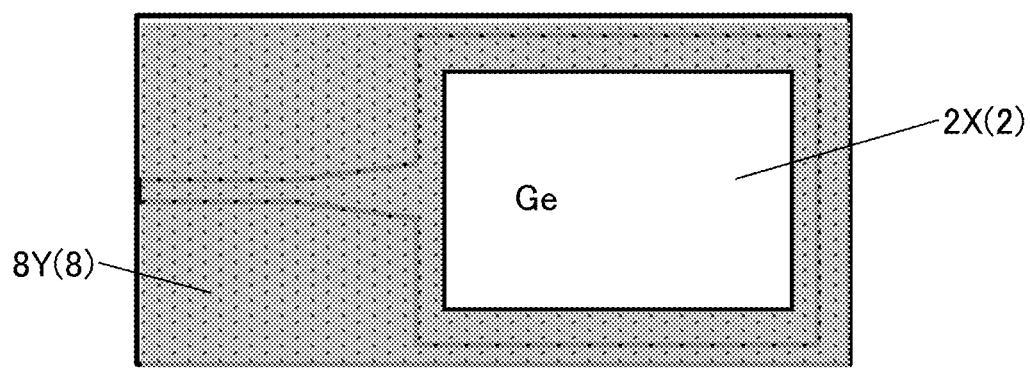
FIG. 58 is plan view (top view) for explaining a concrete example of the configuration of the optical semiconductor device according to the present embodiment.

Next, as illustrated in FIG. 58, a Ge layer 2X is grown into a mesa shape on the substrate prepared in the previous step by, for example, the LP-CVD method.

Here, the thickness of the Ge layer is assumed to be about 300 nm. The dimension of the Ge mesa is, for example, about 30 μm in overall length and about 10 μm in overall width.

Figure 59:
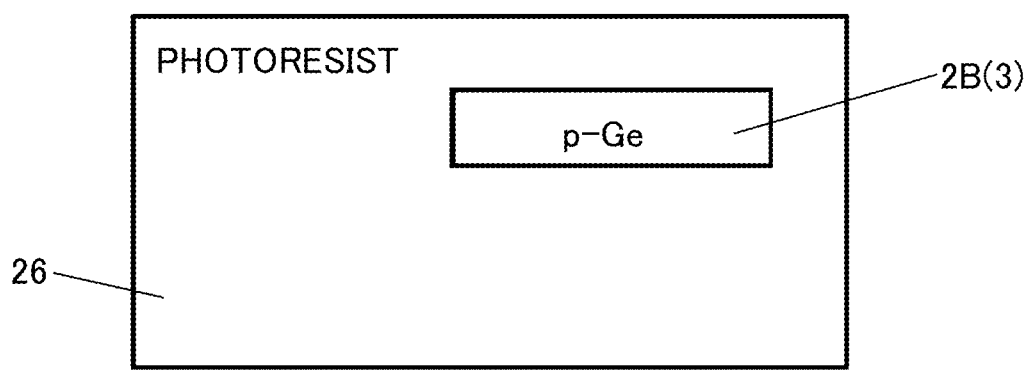
FIG. 59 is plan view (top view) for explaining a concrete example of the configuration of the optical semiconductor device according to the present embodiment.

Next, as illustrated in FIG. 59, under a state where a resist mask 26 is formed on the entire surface by, for example, photolithography, ion implantation is performed to give the p-type conductivity to a part of the Ge mesa 2X and thereby a p-type region 2B (p-type semiconducting region; first conductive region 3) is formed.

For example, boron (B) ions are implanted so that the impurity density becomes about 2E18 [cm$^{-3}$].

Figure 60:
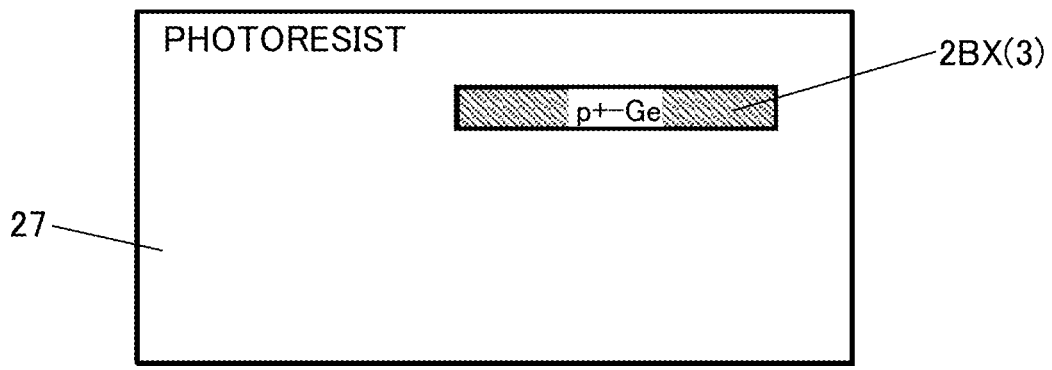
FIG. 60 is plan view (top view) for explaining a concrete example of the configuration of the optical semiconductor device according to the present embodiment.

Thereafter, the resist is removed, and as illustrated in FIG. 60, another resist mask 27 is formed by, for example, photolithography, to give the p$^+$ type conductivity to the p-type region 2B of the Ge mesa 2X, so that a p$^+$ type region 2BX (high impurity density region) is formed.

For example, B ions are implanted so that the impurity density becomes about 1E19 [cm$^{-3}$].

Figure 61:
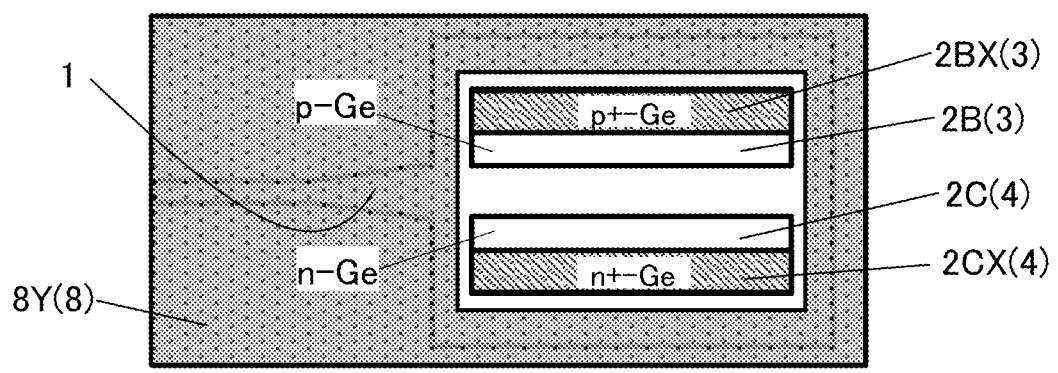
FIG. 61 is plan view (top view) for explaining a concrete example of the configuration of the optical semiconductor device according to the present embodiment.

Similarly, resist mask forming and ion implantation are repeated to form an n-type region 2C (n-type semiconductor region; second conductive region 4) and a n$^+$ type region 2CX (high impurity density region), as illustrated in FIG. 61.

Here, when an n-type region is formed, for example, P (phosphorus) ions are implanted to set the impurity density to about 2E18 [cm$^{-3}$], and when n$^+$ type region is formed, P (phosphorus) ions are implanted to set the impurity density to 1E19 [cm$^{-3}$].

FIG. 61 is a top view illustrating a state in which the resist is removed after these steps.

Then, annealing for activating the implanted impurity is performed.

For example, the dopant is activated by being placed in an atmosphere of about 600° C. for about 10 seconds.

Figure 62:
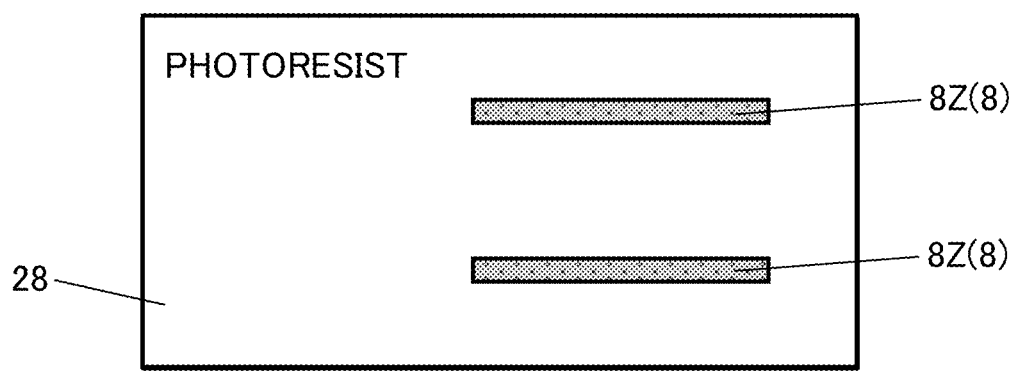
FIG. 62 is plan view (top view) for explaining a concrete example of the configuration of the optical semiconductor device according to the present embodiment.
Figure 63:
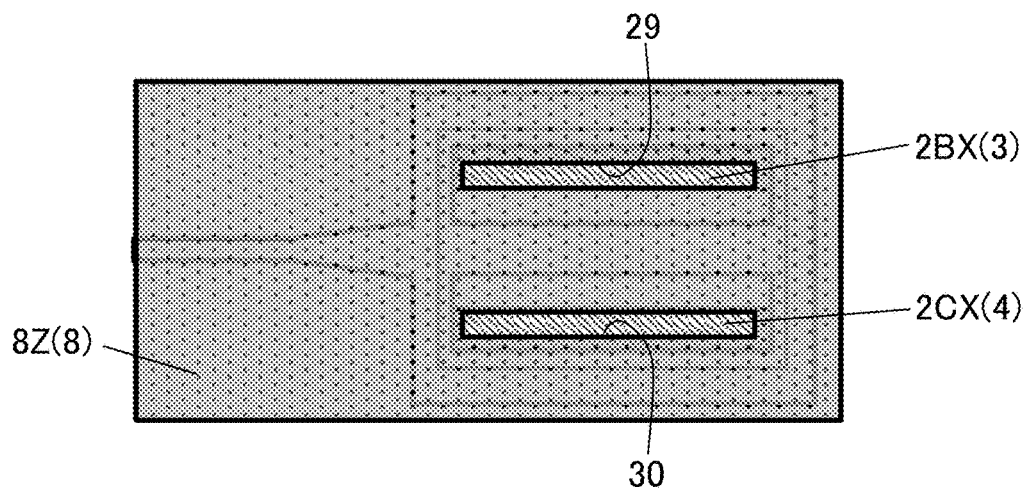
FIG. 63 is plan view (top view) for explaining a concrete example of the configuration of the optical semiconductor device according to the present embodiment.

Next, as illustrated in FIG. 62, an SiO$_2$ film 8Z is formed on the entire surface by, for example, the CVD method; a resist mask 28 is formed by, for example, photolithography, and the SiO$_2$ film 8Z is processed (shaped) by dry etching using the resist mask 28; and as illustrated in FIG. 63, contact holes 29, 30 are formed such that only the regions to form metal contacts on the p$^+$ type region 2BX and n$^+$ type region 2CX (p- and n-bipolar region) formed in the Ge mesa 2X are exposed.

Figure 64:
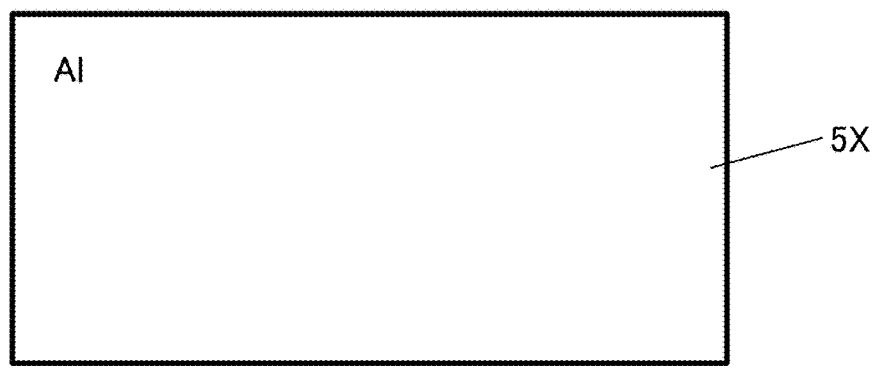
FIG. 64 is plan view (top view) for explaining a concrete example of the configuration of the optical semiconductor device according to the present embodiment.
Figure 65:
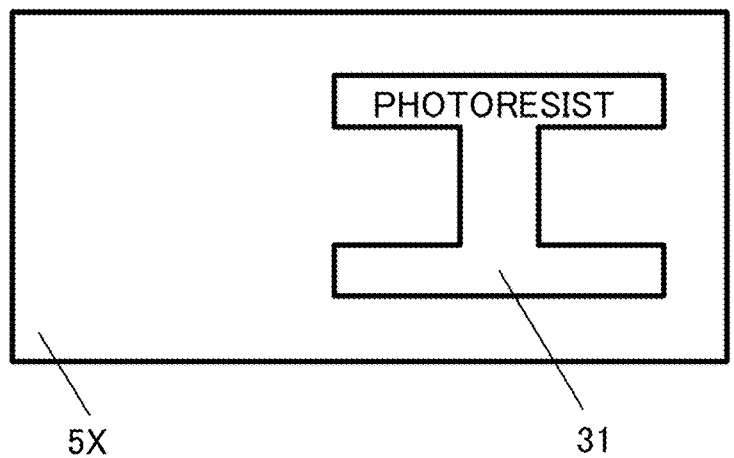
FIG. 65 is plan view (top view) for explaining a concrete example of the configuration of the optical semiconductor device according to the present embodiment.
Figure 66:
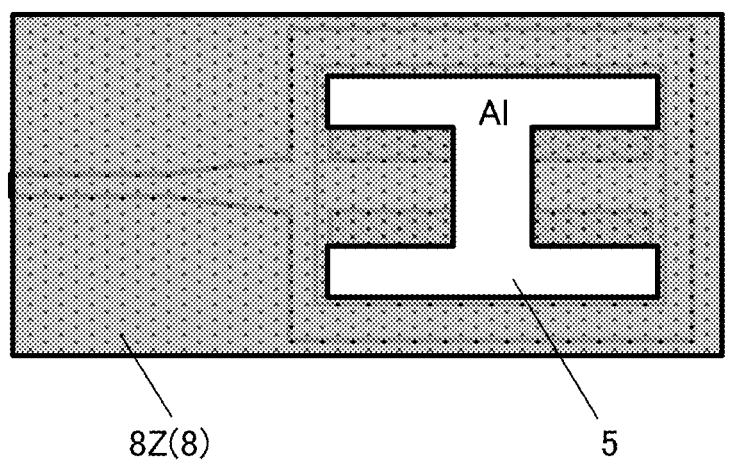
FIG. 66 is plan view (top view) for explaining a concrete example of the configuration of the optical semiconductor device according to the present embodiment.

Subsequently, as illustrated in FIG. 64, an Al film 5X is formed by, for example, a sputtering method; as illustrated in FIG. 65, a resist mask 31 is then formed only in a region where the Al film 5X is to be left by, for example, photolithography; and as illustrated in FIG. 66, an Al film 5X is processed (shaped) by, for example, dry etching; and the Al film 5X (metal film; conductors 5 extending from the first conductive region 3 to the second conductive region 4 so as to short-circuit the first conductive region 3 and the second conductive region 4) is formed in such a shape that the contact holes 29, 30 on the p- and n-bipolar regions 2BX, 2CX are covered and connected to each other. The Al film is also referred to as an Al electrode.

In the above manner, an optical semiconductor device having a structure (second structure) as illustrated in FIGS. 16 and 17 can be manufactured.

Figure 14:
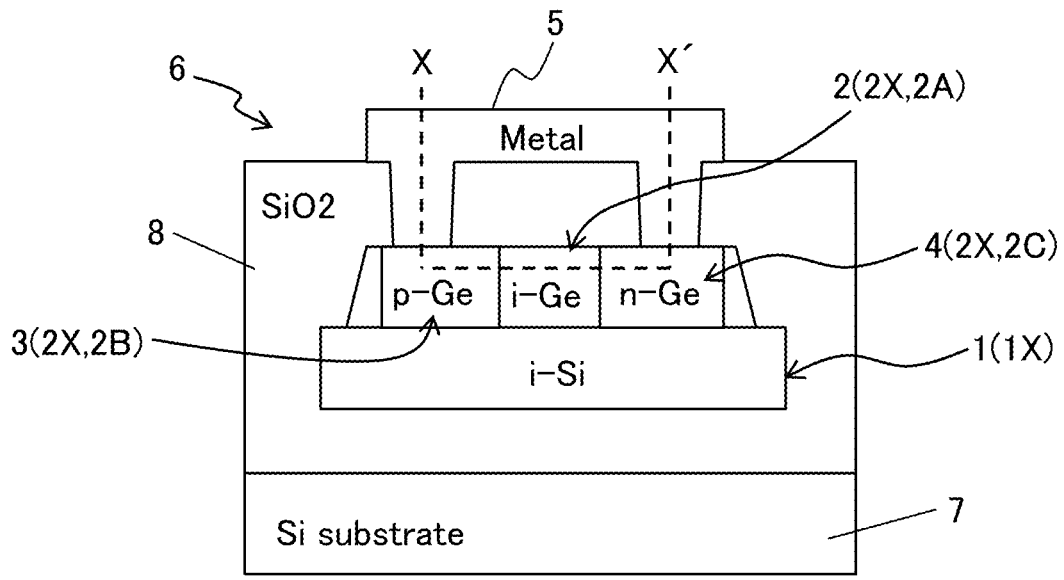
FIG. 14 is a cross-sectional view illustrating an example of the configuration of a second structure (in cases where the conductive regions having the both polarities are provided in a second semiconductor layer) of the optical semiconductor device according to the present embodiment.
Figure 15:
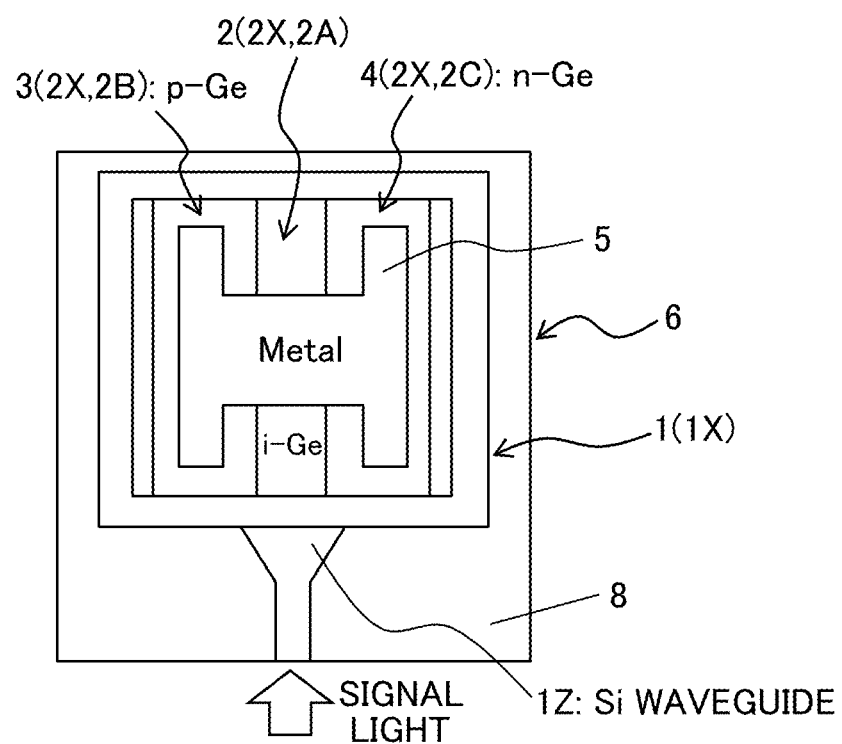
FIG. 15 is a plan view (a top view) illustrating an example of the configuration of a second structure (in cases where the conductive regions having the both polarities are provided in a second semiconductor layer) of the optical semiconductor device according to the present embodiment.

Alternatively, the optical semiconductor device having the structure (second structure) as illustrated in FIGS. 14 and 15 can be manufactured if replacing the four ion implantations with only two p-type ion implantations and two n-type ion implantations in steps of FIGS. 59-61 and carrying out the remaining steps exactly the same as described above.

As one aspect, the optical semiconductor device provides effects that absorption saturation is less likely to occur even if the light intensity increases, so that reflection return light can be reliably suppressed without using an external power source.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical semiconductor device comprising:
   an optical waveguide formed of a first semiconductor layer having a bandgap larger than a photon energy of light propagating through the optical waveguide;
   a light absorbing region coupled to the optical waveguide, formed of a second semiconductor layer disposed over only the first semiconductor layer, and having a bandgap smaller than the photon energy of the light to be used;
   a first conductive region and a second conductive region disposed at both sides of the light absorbing region so as to sandwich the light absorbing region; and
   a conductor coupled to the first conductive region and the second conductive region to let the first conductive region and the second conductive region short-circuit,
   wherein the light is propagated from the first semiconductor layer to the second semiconductor layer by evanescent coupling.

2. The optical semiconductor device according to claim 1, wherein:
   at least a first part of the conductor coupled to the first conductive region and a second part of the conductor coupled to the second conductive region have a same potential; and
   an electric field is applied to the light absorbing region.

3. The optical semiconductor device according to claim 1, wherein:
   the light absorbing region, the first conductive region, the second conductive region, and the conductor collectively serve as an optical terminator.

4. The optical semiconductor device according to claim 1, wherein the conductor is made of metal.

5. The optical semiconductor device according to claim 1, wherein:
   the first conductive region is a p-type semiconductor region in which a p-type impurity is doped;
   the light absorbing region is a non-conductive intrinsic semiconductor region;
   the second conductive region is an n-type semiconductor region in which an n-type impurity is doped; and
   the optical semiconductor device has an PIN diode structure.

6. The optical semiconductor device according to claim 1, wherein:
   the light absorbing region is an intrinsic semiconductor region of the second semiconductor layer;
   the first conductive region is formed of a p-type semiconductor region of the first semiconductor layer in which region a p-type impurity is doped; and
   the second conductive region is formed of an n-type semiconductor region of the first semiconductor layer in which region an n-type impurity is doped.

7. The optical semiconductor device according to claim 6, wherein:
   the first conductive region and the second conductive region are disposed at both horizontal sides of the light absorbing region so as to sandwich the light absorbing region.

8. The optical semiconductor device according to claim 6, wherein:
   the first conductive region and the second conductive region are disposed at both vertical sides of the light absorbing region so as to sandwich the light absorbing region.

9. The optical semiconductor device according to claim 6, wherein: the p-type semiconductor region includes, at a region coupled to the conductor, a high impurity content region having a higher impurity content than that of a remaining region.

10. The optical semiconductor device according to claim 6, wherein: the n-type semiconductor region includes, at a region coupled to the conductor, a high impurity content region having a higher impurity content than that of a remaining region.

11. The optical semiconductor device according to claim 1, wherein:
the light absorbing region is an intrinsic semiconductor region of the second semiconductor layer;
the first conductive region is a p-type semiconductor region of the second semiconductor layer in which region a p-type impurity is doped; and
the second conductive region is an n-type semiconductor region of the second semiconductor layer in which region an n-type impurity is doped.

12. The optical semiconductor device according to claim 1, wherein:
the light absorbing region is an intrinsic semiconductor region of the second semiconductor layer;
the first conductive region is a p-type semiconductor region of the first semiconductor layer in which region a p-type impurity is doped; and
the second conductive region is an n-type semiconductor region of the second semiconductor layer in which region an n-type impurity is doped.

13. The optical semiconductor device according to claim 1, wherein:
the first semiconductor layer is made of Si; and
the second semiconductor layer is made of $Si(x)Ge(1-x)$ (where, $0 \leq x < 1$).

14. The optical semiconductor device according to claim 1, wherein:
the first semiconductor layer is made of Si; and
the second semiconductor layer is made of $Ge(1-x)Sn(x)$ (where, $0 \leq x < 1$).

15. The optical semiconductor device according to claim 1, wherein: the optical waveguide has a tapered structure in which a width of the tapered waveguide varies at a light incident region to the light absorbing region.

* * * * *